(12) United States Patent
Dong et al.

(10) Patent No.: US 11,662,613 B2
(45) Date of Patent: May 30, 2023

(54) SWITCHABLE VIEWING ANGLE DISPLAY MODULE AND VEHICLE

(71) Applicant: Shanghai AVIC Optoelectronics Co., Ltd., Shanghai (CN)

(72) Inventors: Qiang Dong, Shanghai (CN); Xiaoping Sun, Shanghai (CN); Xiongping Li, Shanghai (CN); Qiongqin Mao, Shanghai (CN)

(73) Assignee: Shanghai AVIC Optoelectronics Co., Ltd., Shanghai (CN)

( * ) Notice: Subject to any disclaimer, the term of this patent is extended or adjusted under 35 U.S.C. 154(b) by 0 days.

(21) Appl. No.: 17/713,354

(22) Filed: Apr. 5, 2022

(65) Prior Publication Data
US 2022/0229320 A1    Jul. 21, 2022

(30) Foreign Application Priority Data
Dec. 31, 2021  (CN) .......................... 202111673787.4

(51) Int. Cl.
*G02F 1/1343*  (2006.01)
*G02F 1/13*  (2006.01)
*G02F 1/01*  (2006.01)

(52) U.S. Cl.
CPC .......... *G02F 1/1323* (2013.01); *G02F 1/0121* (2013.01); *G02F 1/134309* (2013.01); *G02F 2202/04* (2013.01)

(58) Field of Classification Search
CPC ................. G02F 1/1323; G02F 1/0121; G02F 1/134309; G02F 2202/04
See application file for complete search history.

(56) References Cited

U.S. PATENT DOCUMENTS
2017/0219859 A1*  8/2017  Christophy ........... G02F 1/1336

FOREIGN PATENT DOCUMENTS

| CN | 1987989 A | 6/2007 |
|---|---|---|
| CN | 101847376 B | 10/2013 |
| CN | 108363250 A | 8/2018 |
| CN | 109116641 A | 1/2019 |

\* cited by examiner

*Primary Examiner* — James A Dudek
(74) *Attorney, Agent, or Firm* — KDW Firm PLLC

(57) ABSTRACT

Provided are a switchable viewing angle display module and a vehicle. The display module comprises a viewing angle switching panel, a liquid crystal display panel, and a driver circuit. The viewing angle switching panel includes a first substrate and a second substrate, a dye liquid crystal layer, and a drive electrode layer. The drive electrode layer is disposed on a side of the first substrate and/or the second substrate facing the dye liquid crystal layer. The drive electrode layer includes a plurality of drive electrodes arranged sequentially along a first direction, and an interval of a preset length is set between two adjacent ones of the plurality of drive electrodes. The driver circuit is electrically connected to the plurality of drive electrodes, respectively and configured to provide sequentially increasing drive voltages to the plurality of drive electrodes arranged sequentially along the first direction.

20 Claims, 20 Drawing Sheets

Power-off state

Power-on state

Power-off state

First power-on state

Second power-on state

SWITCHABLE VIEWING ANGLE DISPLAY MODULE AND VEHICLE

CROSS-REFERENCE TO RELATED APPLICATION(S)

This application claims priority to Chinese Patent Application No. 202111673787.4 filed Dec. 31, 2021, the disclosure of which is incorporated herein by reference in its entirety.

TECHNICAL FIELD

Embodiments of the present disclosure relate to the field of display technologies and, in particular, to a switchable viewing angle display module and a vehicle.

BACKGROUND

With the gradual maturity of liquid crystal display (LCD for short) related technologies, and more and more attention is paid to personal privacy protection, more and more privacy protection products have emerged in recent years. At present, an attached film or a viewing angle control structure is generally used in a common privacy protection product to reduce light outputted from a large angle, thereby achieving privacy protection by narrowing the viewing angle.

However, a privacy protection scheme of the attached film cannot achieve the switching between a privacy protection mode and a normal mode, and in order that the privacy protection mode is cancelled, a privacy protection film needs to be removed or destroyed. At the same time, through a privacy protection scheme of an existing viewing angle control structure, not only the light outputted from a large angle is limited, but also a light output rate is affected and energy consumption is increased. Moreover, a privacy function of the existing viewing angle control structure is for a whole surface so that not only the privacy function for a specific direction cannot be achieved, but also a light extraction efficiency of a display panel is affected, thereby increasing power consumption of the display panel.

SUMMARY

The present disclosure provides a switchable viewing angle display module and a vehicle.

In a first aspect, an embodiment of the preset disclosure provides a switchable viewing angle display module. The switchable viewing angle display module includes a viewing angle switching panel and a liquid crystal display panel, where the viewing angle switching panel is disposed on a light-emitting side of the liquid crystal display panel; and the viewing angle switching panel includes a first substrate and a second substrate, a dye liquid crystal layer, and a drive electrode layer.

The dye liquid crystal layer is disposed between the first substrate and the second substrate.

The drive electrode layer is disposed on a side of the first substrate and/or a side of the second substrate facing the dye liquid crystal layer, where the drive electrode layer includes a plurality of drive electrodes arranged sequentially along a first direction, an interval of a preset length is set between two adjacent ones of the plurality of drive electrodes, and the first direction is parallel to a light-emitting surface of the switchable viewing angle display module.

The switchable viewing angle display module further includes a driver circuit, where the driver circuit is electrically connected to the plurality of drive electrodes, respectively and is configured to provide sequentially increasing drive voltages to the plurality of drive electrodes arranged sequentially along the first direction.

In a second aspect, an embodiment of the preset disclosure further provides a switchable viewing angle display module. The switchable viewing angle display module includes a viewing angle switching panel and a liquid crystal display panel, where the viewing angle switching panel is disposed on a light-emitting side of the liquid crystal display panel; and the viewing angle switching panel includes a first substrate and a second substrate, a dye liquid crystal layer, and a drive electrode layer.

The dye liquid crystal layer is disposed between the first substrate and the second substrate.

The drive electrode layer is disposed on a side of the first substrate and/or a side of the second substrate facing the dye liquid crystal layer, where the drive electrode layer includes a plurality of drive electrodes arranged sequentially along a first direction, an interval of a preset length is set between two adjacent ones of the plurality of drive electrodes, and the first direction is parallel to a light-emitting surface of the switchable viewing angle display module.

The switchable viewing angle display module further includes a driver circuit.

The driver circuit includes a control bus and a plurality of electrical device combinations, each of the plurality of electrical device combinations includes a first electrical device and a second electrical device, and the control bus is electrically connected to a control signal port; in each of the plurality of electrical device combinations, a first terminal of the first electrical device is electrically connected to the control bus, a second terminal of the first electrical device is electrically connected to a first terminal of the second electrical device, and a second terminal of the second electrical device is electrically connected to a common signal port; in each of the plurality of electrical device combinations, the first terminal of each second electrical device is also electrically connected to one of the plurality of drive electrodes arranged sequentially along the first direction; and among the plurality of electrical device combinations corresponding to the plurality of drive electrodes arranged sequentially along the first direction, resistance ratios of first electrical devices and the second electrical devices increase sequentially.

In an embodiment, the driver circuit includes a control bus and a plurality of third electrical devices, the plurality of third electrical devices are sequentially connected in series with the control bus, the plurality of drive electrodes arranged sequentially along the first direction are electrically connected to the control bus respectively, and connection nodes of the plurality of drive electrodes and the control bus and the plurality of third electrical devices are sequentially and alternately arranged.

In a third aspect, an embodiment of the present disclosure further provides a vehicle. The vehicle includes the switchable viewing angle display module in any one of the first aspect or the second aspect.

DETAILED DESCRIPTION

Figure 1:
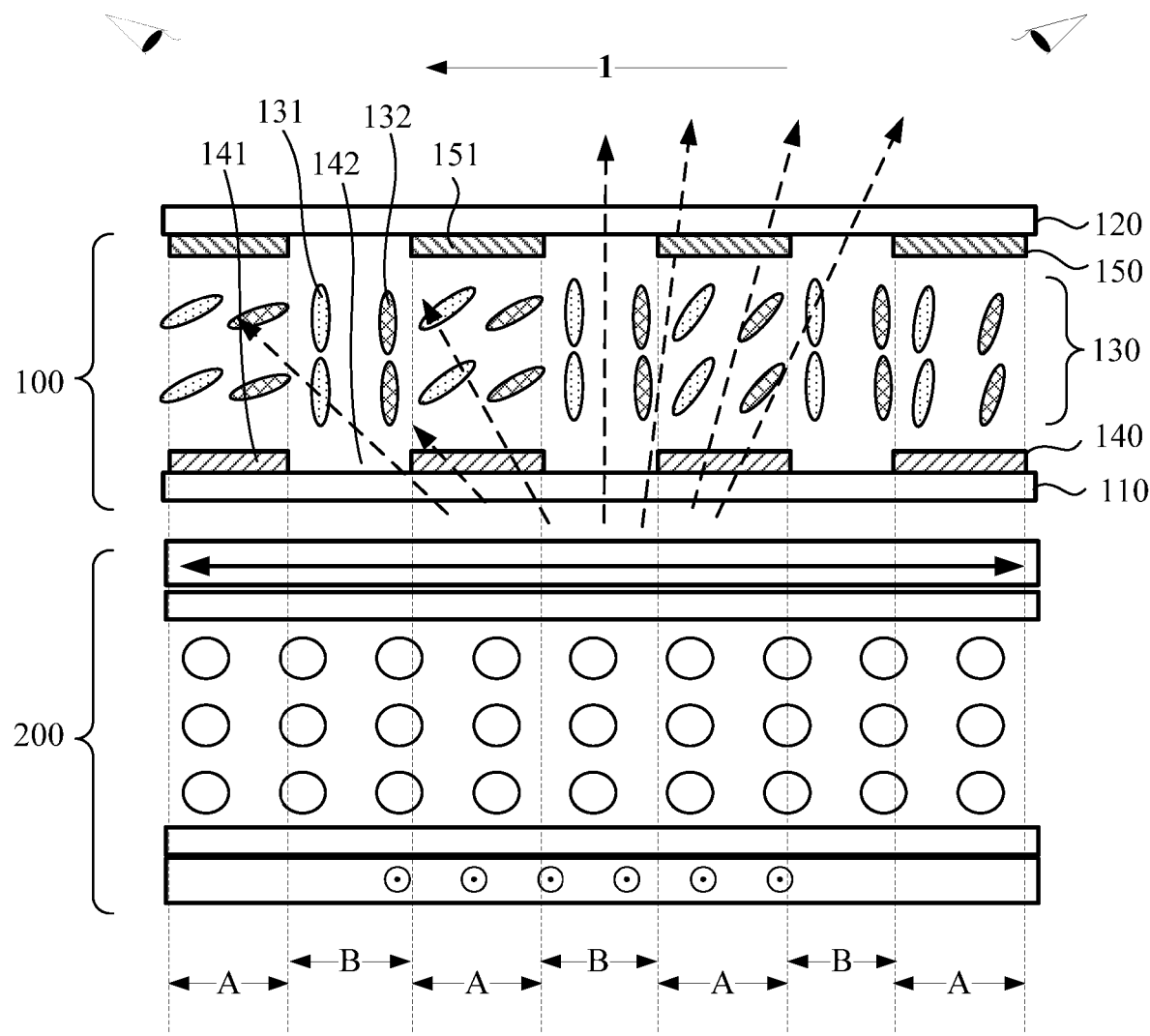
FIG. 1 is a structural diagram of a switchable viewing angle display module according to an embodiment of the present disclosure.

The present disclosure is further described below in detail in conjunction with drawings and embodiments. It is to be understood that embodiments described hereinafter are merely intended to explain the present disclosure and not to limit the present disclosure. Additionally, it is to be noted that for ease of description, only part, not all, of structures related to the present disclosure are illustrated in the drawings.

FIG. 1 is a structural diagram of a switchable viewing angle display module according to an embodiment of the present disclosure. Referring to FIG. 1, the switchable viewing angle display module includes a viewing angle switching panel 100 and a liquid crystal display panel 200, where the viewing angle switching panel 100 is disposed on a light-emitting side of the liquid crystal display panel 200. The viewing angle switching panel 100 includes a first substrate 110 and a second substrate 120, a dye liquid crystal layer 130, and a drive electrode layer 140. The dye liquid crystal layer 130 is disposed between the first substrate 110 and the second substrate 120. The drive electrode layer 140 is disposed on a side of the first substrate 110 and/or the second substrate 120 facing the dye liquid crystal layer 130, where the drive electrode layer 140 includes multiple drive electrodes 141 arranged sequentially along a first direction 1, an interval 142 of a preset length is set between two adjacent drive electrodes 141, and the first direction 1 is parallel to a light-emitting surface of the switchable viewing angle display module. The switchable viewing angle display module further includes a driver circuit 300, where the driver circuit 300 is electrically connected to the multiple drive electrodes 141, respectively and configured to provide sequentially increasing drive voltages to the multiple drive electrodes 141 arranged sequentially along the first direction 1.

A main function of the viewing angle switching panel 100 is to limit an angle of light emitted from the liquid crystal display panel 200 so as to avoid light from being emitted from a large angle. Moreover, the viewing angle switching panel 100 has a switch function. In an open state, the viewing angle switching panel is responsible for limiting an angle of emitted light, and at this time, the entire display module is in a narrow viewing angle display mode, that is, in a privacy protection mode; in a closed state, light may pass through the viewing angle switching panel 100, and the light emitted from the liquid crystal display panel 200 is not limited, and at this time, the entire display module is in a wide viewing angle display mode, that is, in a normal display mode.

In addition, in an embodiment of the present disclosure, the drive electrode layer 140 in the viewing angle switching panel 100 includes multiple drive electrodes 141 arranged sequentially along the first direction 1, and the driver circuit 300 provides sequentially increasing drive voltages to the multiple drive electrodes 141 arranged sequentially along the first direction 1, thereby essentially limiting light exit angles differently in regions where different drive electrodes 141 are located and achieving gradual changes in light exit angles at different positions along the first direction 1 on a light-emitting surface of the entire display module.

In an embodiment, each drive electrode 141 in the drive electrode layer 140 is configured to form an electric field to drive liquid crystal molecules 131 in the dye liquid crystal layer 130 and drive dye molecules 132 to rotate so that the liquid crystal molecules and dye molecules in a region where the dye liquid crystal layer 130 is located are in a state where light is blocked from being emitted from a large angle. Positions where the drive electrodes 141 are provided depend on an alignment direction of the liquid crystal and an electric field design method. The drive electrodes 141 may be disposed on a side of the first substrate 110 facing the dye liquid crystal layer 130, may be disposed on a side of the second substrate 120 facing the dye liquid crystal layer 130, and may also be disposed on the side the first substrate 110 facing the dye liquid crystal layer 130 and the side of the second substrate 120 facing the dye liquid crystal layer 130, which is not limited in embodiments of the present disclosure. For a region where non-drive electrodes 141 are located, when the interval 142 between the drive electrodes 141 is relatively large, the liquid crystal molecules 131 and the dye molecules 132 are less affected by the electric field, it can be considered that the deflection of the liquid crystal molecules 131 and the dye molecules 132 does not substantially occur, and the light emitted from the liquid crystal display panel 200 may be directly transmitted with the light exit angle unlimited.

It is to be understood from this that in a power-on state, the drive electrodes 141 arranged sequentially along the first direction 1 may form a shutter effect, that is, a region where the drive electrodes 141 are located may appropriately block the light emitted from a large angle, so as to narrow the viewing angle and make the liquid crystal display panel 200 in a narrow viewing angle display state or a privacy protection state; and in a power off state, the viewing angle switching panel 100 does not have the effect of narrowing the viewing angle on the liquid crystal display panel 200, and the display module may still be in a wide viewing angle display state. In other words, the display module may be controlled to switch between wide and narrow viewing angle display modes by powered on or not, so as to satisfy privacy protection requirements in different scenarios.

Further, in the embodiments of the present disclosure, due to different drive voltages received by the drive electrodes, limitations on the light exit angles of light are also different. Therefore, the narrow viewing angle display mode in the embodiments of the present disclosure is not a uniform narrow viewing angle mode. The structure and principle are introduced hereinafter. The driver circuit 300 provides sequentially increasing drive voltages to the multiple drive electrodes 141 arranged sequentially along the first direction 1, that is, an electric field strength formed by each drive electrode 141 along the first direction 1 gradually increases, a deflection effect on the liquid crystal molecules 131 and the dye molecules 132 gradually increases, and an angle limit of the emitted light in the first direction 1 also gradually increases, that is, a viewing angle of a side facing the first direction 1 is relatively small, thereby ensuring an apparent privacy protection effect. Therefore, the switchable viewing angle display module provided in the embodiments of the present disclosure may be applied to a scenario where one side privacy protection is required, for example, a scenario where privacy protection for a main driving seat is required in a display screen of a car machine. From a side facing away from the first direction 1, the viewing angle switching panel has less limitations on the light exit angle of the liquid crystal display panel, a display viewing angle is relatively large, and light transmittance is higher, thereby satisfying normal display requirements with a light extraction efficiency and power consumption of the panel less affected, that is, in the case where brightness satisfies the normal display requirements, brightness of the backlight does not need to be greatly increased so that the power consumption is relatively small.

In the technical solution, a switchable viewing angle display module includes a viewing angle switching panel and a liquid crystal display panel, where the viewing angle switching panel is disposed on a light-emitting side of the liquid crystal display panel; and the viewing angle switching panel includes a first substrate and a second substrate, a dye liquid crystal layer, and a drive electrode layer, where the dye liquid crystal layer is disposed between the first substrate and the second substrate, and the drive electrode layer is disposed on a side of the first substrate and/or the second substrate facing the dye liquid crystal layer, where the drive electrode layer includes multiple drive electrodes arranged sequentially along a first direction, an interval of a preset length is set between two adjacent drive electrodes, and the first direction is parallel to a light-emitting surface of the switchable viewing angle display module; where the switchable viewing angle display module further includes a driver circuit electrically connected to the multiple drive electrodes, respectively and configured to provide sequentially increasing drive voltages to the multiple drive electrodes arranged sequentially along the first direction. The embodiment of the present disclosure solves a problem of a single privacy protection mode of an existing privacy protection panel, achieves not only the switching between a privacy protection mode and a normal display mode but also privacy protection for a specific side, and adapts to different usage scenarios to satisfy usage requirements in different scenarios. In addition, in the embodiment of the present disclosure, the shading of the liquid crystal display panel may be appropriately reduced, and a light extraction efficiency of the liquid crystal display panel is improved, which is conducive to reducing the brightness of a backlight module of the liquid crystal display panel, thereby effectively avoiding the problem of excessive power consumption of the liquid crystal display panel.

Figure 2:
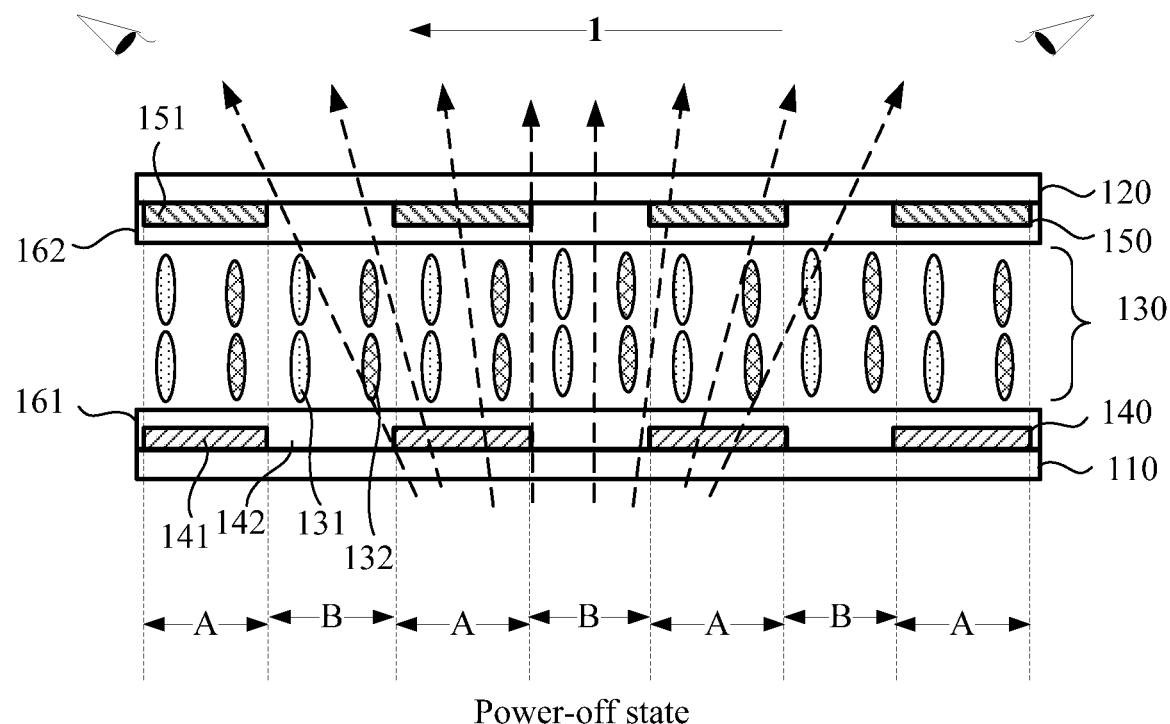
FIGS. 2 and 3 are structural diagrams of power-on and power-off states of a viewing angle switching panel in FIG. 1.
Figure 3:
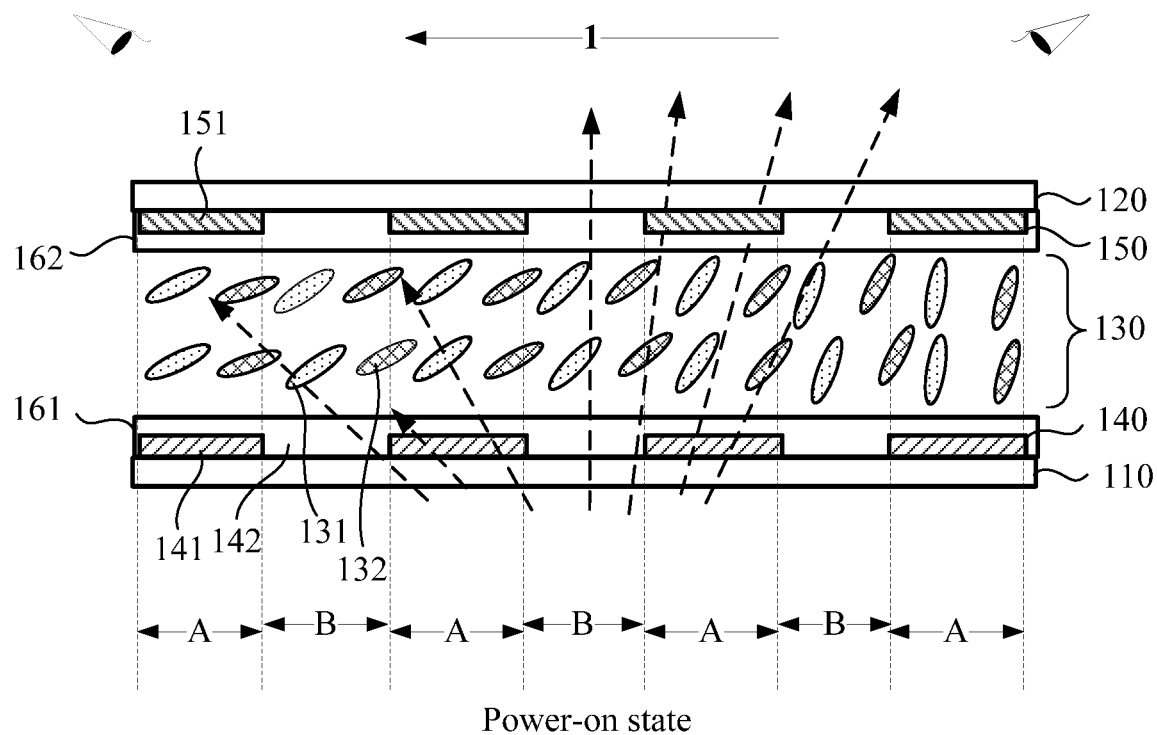

FIGS. 2 and 3 are structural diagrams of power-on and power-off states of a viewing angle switching panel in FIG. 1. Referring to FIGS. 1 to 3, the structure and principle of the viewing angle switching panel provided in the embodiments of the present disclosure are described. First, the viewing angle switching panel 100 further includes a common electrode layer 150 disposed on a side of the second substrate 120 and/or the first substrate 110 facing the dye liquid crystal layer 130, where the common electrode layer 150 includes multiple common electrodes 151 arranged sequentially along the first direction 1 and vertical projections of the common electrodes 151 on a plane where the drive electrode layer 140 is located at least partially overlap the drive electrodes 141 in a one-to-one correspondence.

Further, a first alignment layer 161 is further disposed on a side of the first substrate 110 facing the dye liquid crystal layer 130, and a second alignment layer 162 is further disposed on a side of the second substrate 120 facing the dye liquid crystal layer 130; the first alignment layer 161 and the second alignment layer 162 have a same alignment direction in a same region.

Based on this, an example of the viewing angle switching panel 100 in this embodiment may be a vertical alignment (VA) type liquid crystal cell, that is, the first alignment layer 161 and the second alignment layer 162 are essentially vertically aligned. In addition, the liquid crystal molecules 131 in the viewing angle switching panel 100 are negative liquid crystals, and short axes of the negative liquid crystal molecules 131 tend to be parallel to a direction of the electric field under the action of the electric field.

When no drive voltage is applied to the drive electrodes 141, affected by the vertical alignment, long axes of the liquid crystal molecules 131 in the dye liquid crystal layer 130 are perpendicular to the substrate, that is, in an upright state, and the dye molecules are also in an upright state. At this time, the viewing angle switching panel 100 does not have a function of limiting the exit angle of the emitted light of the liquid crystal display panel 200, and the switchable viewing angle display module is in a normal display state. As shown in FIG. 2, both eyes are indicated by a solid line so as to indicate visibility.

When the driver circuit 300 provides drive voltages to the drive electrodes 141, that is, when the drive electrodes 141 are in a power-on state, the common electrodes 151 and the drive electrodes 141 on upper and lower sides of the dye liquid crystal layer 130 form a vertical electric field so that long axes of the negative liquid crystal molecules 131 tend to change from being perpendicular to the substrate to forming an angle with the substrate, where the angle depends on an electric field strength in a region where the liquid crystal molecules 131 are located, that is, on magnitudes of the drive voltages applied to the drive electrodes 141. It is to be understood that when sequentially increasing drive voltages are applied to the drive electrodes 141 along the first direction 1, deflection angles of the liquid crystal molecules 131 in regions corresponding to the drive electrodes 141 are also larger (the deflection here refers to deflection from a state of being perpendicular to the substrate to a state of being parallel to the substrate), the dye molecules 132 are also deflected with the driving of the liquid crystal molecules 131, and since long axes of the dye molecules 132 have a light absorbing effect, the larger deflection angles of the dye molecules 132 are, the larger the light-emitting limitations on light emitted from a large angle are, that is, the larger the limitations of regions corresponding to the drive electrodes 141 arranged sequentially along the first direction 1 on the light exit angle are. Therefore, in the power-on state, the switchable viewing angle display module achieves a privacy protection state for a specific side, and it is to be understood that the privacy protection side depends on an arrangement direction of the drive electrodes, that is, a side facing the first direction is the privacy protection side. As shown in FIG. 3, a left eye is indicated by a dotted line so as to indicate that the viewing angle display is invisible, and a right eye is indicated by a solid line so as to indicate that the viewing angle display is visible.

Figure 4:
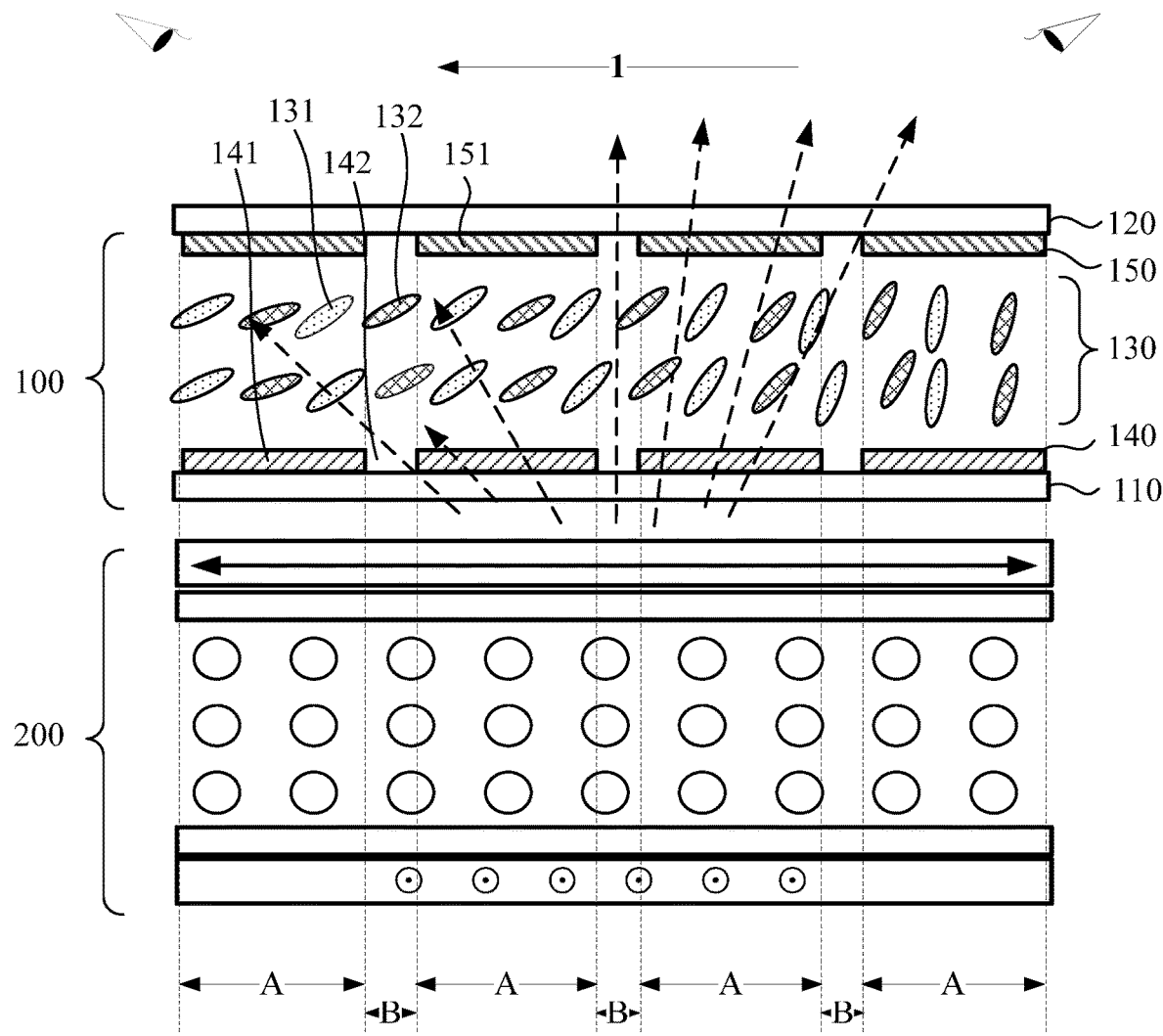
FIG. 4 is a structural diagram of another switchable viewing angle display module according to an embodiment of the present disclosure.
Figure 5:
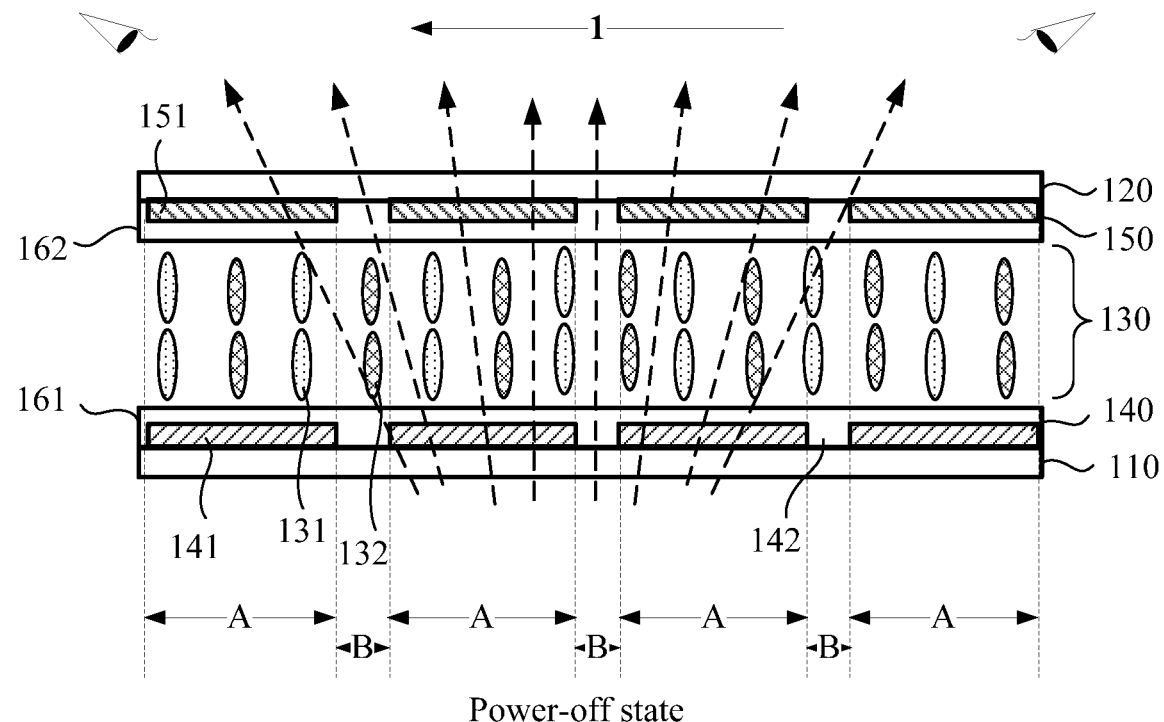
FIGS. 5 and 6 are structural diagrams of power-on and power-off states of a viewing angle switching panel in FIG. 4.
Figure 6:
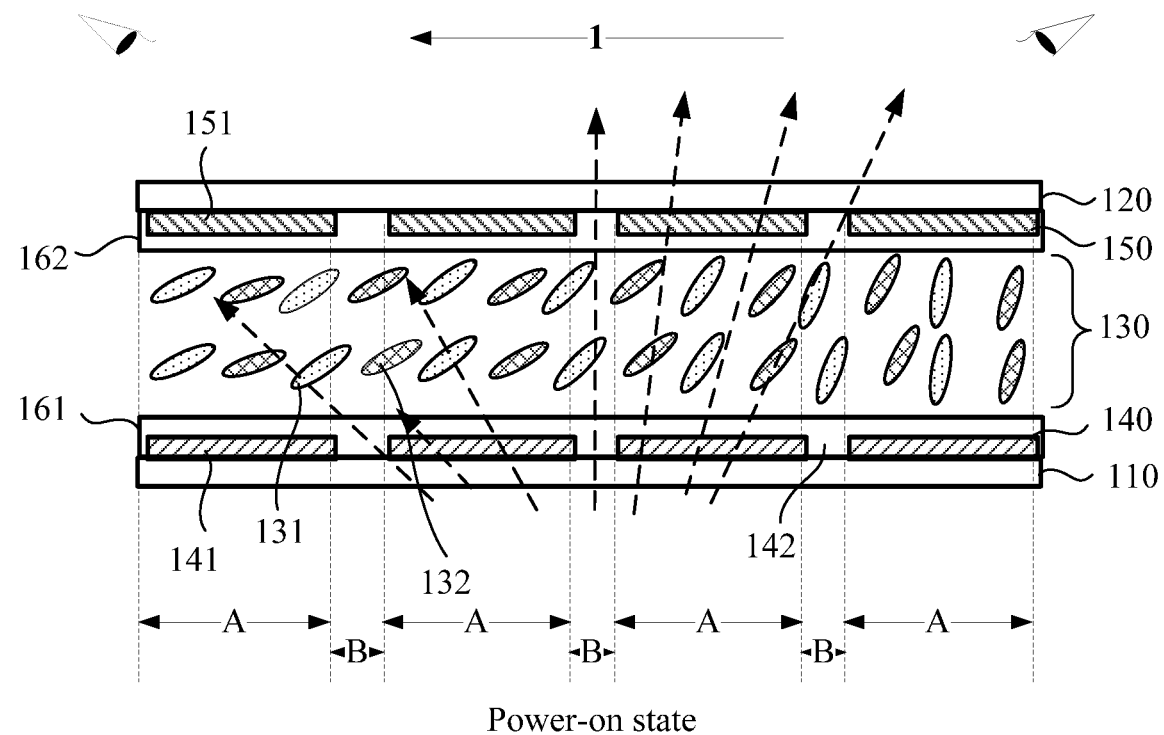

FIG. 4 is a structural diagram of another switchable viewing angle display module according to an embodiment of the present disclosure, and FIGS. 5 and 6 are structural diagrams of power-on and power-off states of a viewing angle switching panel in FIG. 4. Referring to FIGS. 4 to 6, a difference from the switchable viewing angle display module shown in FIG. 1 is that in this embodiment, the interval 142 between the drive electrodes 141 may be adjusted reasonably, that is, the interval 142 is set relatively narrow. Based on the manner of setting the drive electrodes, referring to FIG. 5, when no drive voltage is applied to the drive electrodes 141, that is, in a power-off state, similarly, affected by the vertical alignment, long axes of the liquid crystal molecules 131 in the dye liquid crystal layer 130 are perpendicular to the substrate, that is, in an upright state, and the dye molecules are also in an upright state. At this time, the viewing angle switching panel does not have a function of limiting the exit angle of the emitted light of the liquid crystal display panel 200, and the switchable viewing angle display module is in a normal display state. As shown in FIG. 2, both eyes are indicated by a solid line so as to indicate visibility.

When the driver circuit 300 provides drive voltages to the drive electrodes 141, that is, when the drive electrodes 141 are in the power-on state, the common electrodes 151 and the drive electrodes 141 on the upper and lower sides of the dye liquid crystal layer 130 form a vertical electric field so that long axes of the negative liquid crystal molecules 131 tend to change from being perpendicular to the substrate to forming an angle with the substrate. When sequentially increasing drive voltages are applied to the drive electrodes 141 along the first direction 1, the larger the deflection angles of the liquid crystal molecules 131 and the dye molecules 132 in regions corresponding to the drive electrodes 141 are, the larger the light-emitting limitations on the light emitted from a large angle are, that is, the larger the limitations of regions corresponding to the drive electrodes 141 arranged sequentially along the first direction 1 on the light exit angle are, and the switchable viewing angle display module achieves a privacy protection state for a specific direction. It is to be noted that in this embodiment, since the interval 142 between the drive electrodes 141 is relatively small, the liquid crystal molecules 131 and the dye molecules 132 in a region where the interval is located are also affected by the vertical electric field and appropriately deflected. In terms of the entire dye liquid crystal layer, as shown in FIG. 6, the deflection angles of the liquid crystal molecules 131 and the dye molecules 132 increase sequentially along the first direction 1, thereby achieving privacy protection for the first direction, that is, a specific direction.

In the embodiments shown in FIGS. 1 to 6, the case where the alignment direction of the first alignment layer is parallel to the alignment direction of the second alignment layer is only an example of the present disclosure, and the alignment direction of the first alignment layer may also be perpendicular to the alignment direction of the second alignment layer. In the embodiment in which the alignment direction of the first alignment layer is perpendicular to the alignment direction of the second alignment layer, when the drive electrodes are in the power-on state, affected by the vertical alignment, the liquid crystal molecules and the dye molecules tend to be arranged in a twisted shape in a direction perpendicular to the substrate. At this time, long axes of the liquid crystal molecules and the dye molecules also tend to changing from being perpendicular to the substrate to being deflected, thereby limiting the light from being emitted from a large angle, that is, achieving the privacy protection for a specific side.

In addition, in the embodiments of the present disclosure, a vertical projection region of the drive electrode 141 on the first alignment layer 161 or the second alignment layer 162 is an electrode alignment region A, and a vertical projection area of the interval 142 on the first alignment layer 161 or the second alignment layer 162 is an interval alignment region B, where an alignment direction of the electrode alignment region A is perpendicular to an alignment direction of the interval alignment region B.

It is to be understood that in the power-off state, the liquid crystal molecules 131 and the dye molecules 132 are all in an upright state and are not affected by the alignment directions of the two alignment layers, while in the power-on state, the liquid crystal molecules 131 and the dye molecules 132 in the electrode alignment region A are driven by the electric field formed by the drive electrodes 141 to be deflected so that the light exit angle is limited by the dye molecules 132. However, since the interval alignment region B is adjacent to the electrode alignment region, the electric field of the drive electrodes 141 also affects the liquid crystal molecules 131 and the dye molecules 132 in the interval alignment region to a certain extent. In the embodiments of the present disclosure, the alignment direction of the electrode alignment region is configured to be perpendicular to the alignment direction of the interval alignment region so that the liquid crystal molecules 131 and the dye molecules 132 in the interval alignment region may be prevented from being affected by the electric field and deflected in sync with the liquid crystal molecules 131 and the dye molecules 132 in the electrode alignment region. Therefore, privacy protection for a specific side is ensured in the electrode alignment region and privacy protection for a specific side does not function in the interval alignment region so that apparent privacy protection difference exists between the two regions.

It is to be noted that in the preceding embodiments, the viewing angle switching panel 100 adopts a VA liquid crystal cell, which is a preferred embodiment of the present disclosure. In this manner, in the power-off state, it is ensured that the switchable viewing angle display module is in the normal display mode, and power-on control does not need to be performed on the viewing angle switching panel 100 during a display process, which is conducive to reducing power consumption of the entire display module. Of course, based on exemplary embodiments of the present disclosure, those skilled in the art may optionally design the viewing angle switching panel 100 such that the viewing angle switching panel 100 adopts an electrically controlled birefringence (ECB) type, an in-plane switching (IPS) type, or a fringe field switching (FFS) type liquid crystal cell, and embodiments of the ECB type liquid crystal cell are described in detail below.

Figure 7:
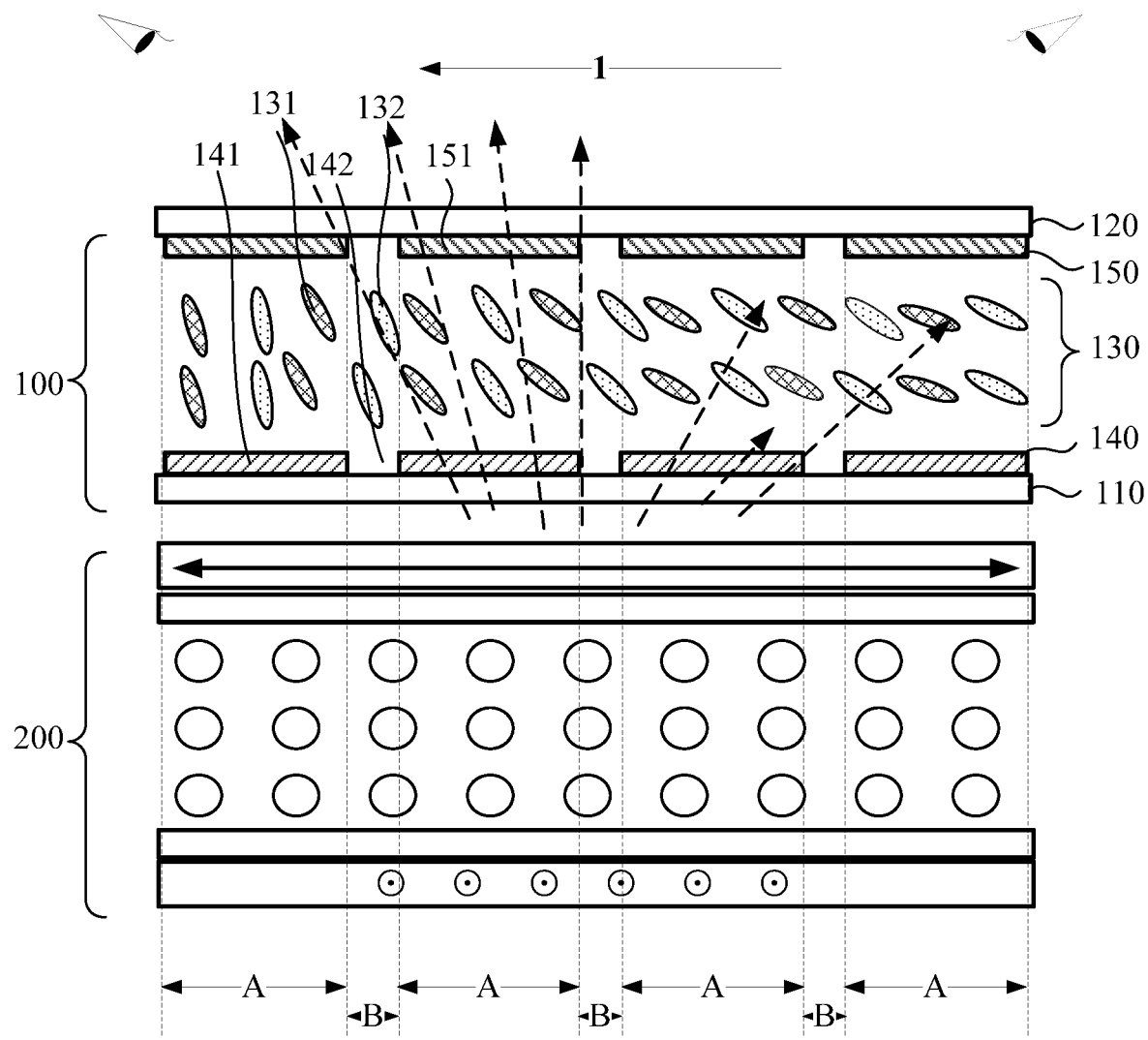
FIG. 7 is a structural diagram of another viewing angle switching panel according to an embodiment of the present disclosure.
Figure 8:
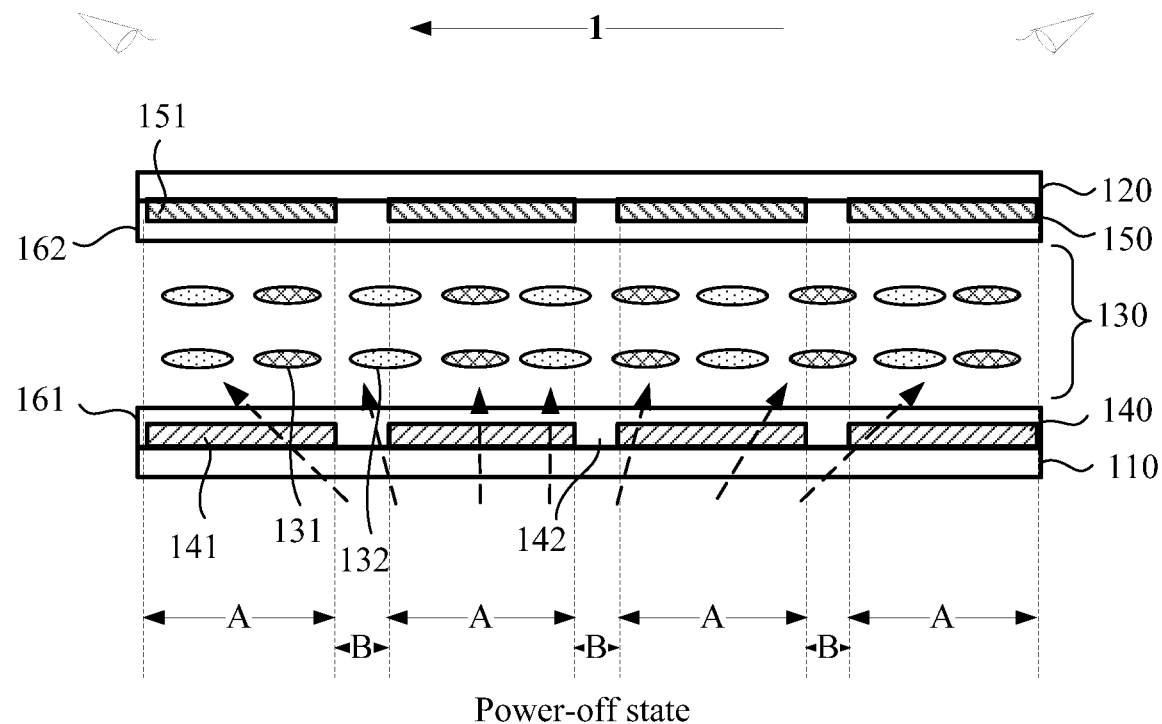
FIGS. 8 to 10 are structural diagrams of a power-off state, a first power-on state, and a second power-on state of the viewing angle switching panel in FIG. 7.
Figure 9:
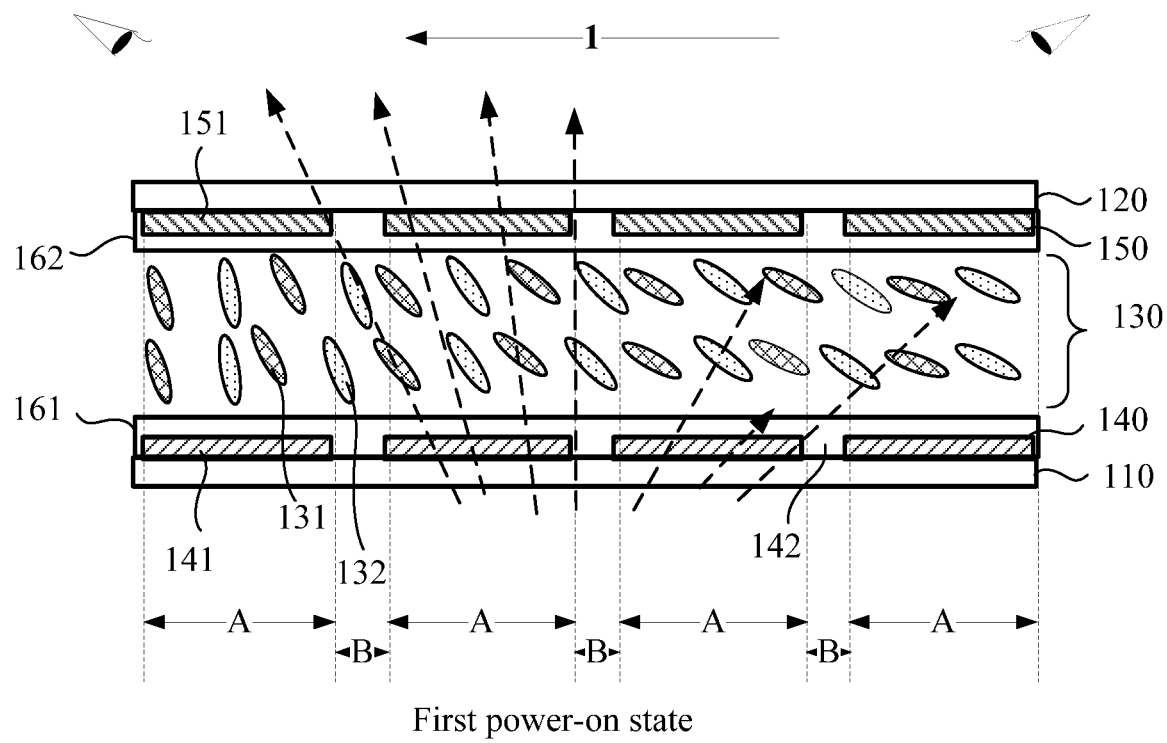
Figure 10:
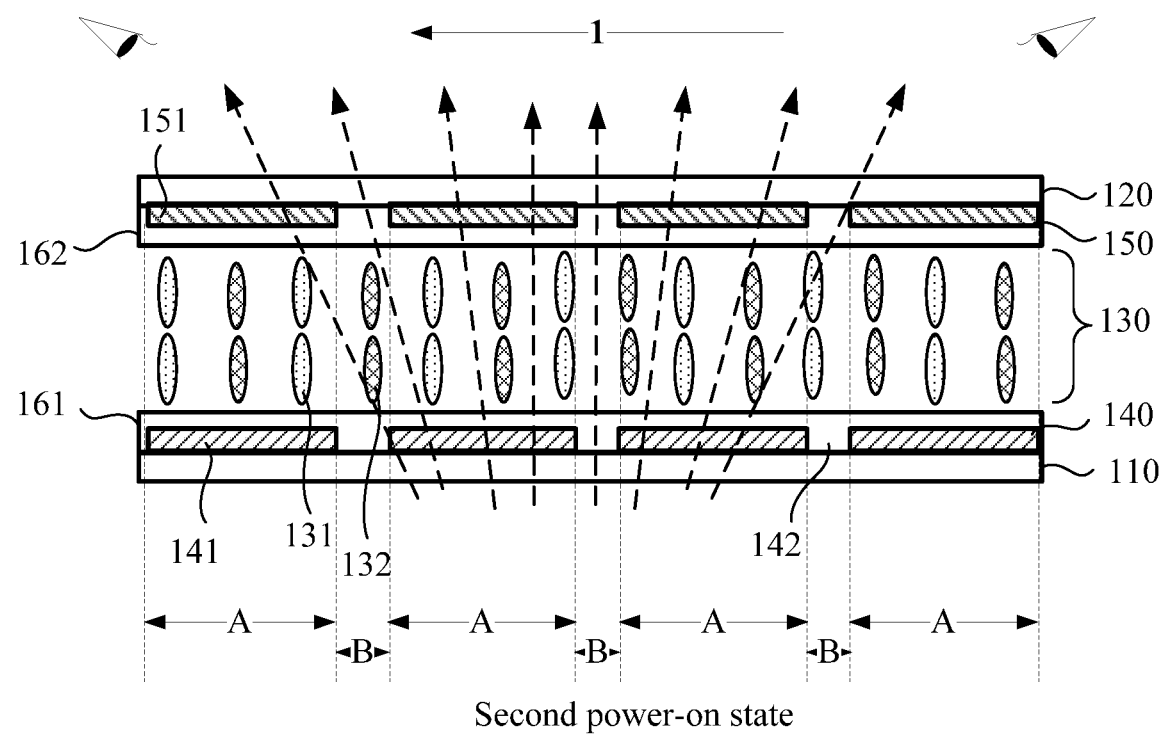

FIG. 7 is a structural diagram of another viewing angle switching panel according to an embodiment of the present disclosure, and FIGS. 8 to 10 are structural diagrams of a power-off state, a first power-on state, and a second power-on state of the viewing angle switching panel in FIG. 7. Referring to FIGS. 7 to 10, the viewing angle switching panel in this embodiment adopts the ECB type liquid crystal cell, where the viewing angle switching panel 100 further includes the common electrode layer 150 disposed on a side of the second substrate 120 and/or the first substrate 110 facing the dye liquid crystal layer 130; the common electrode layer 150 includes multiple common electrodes 151 arranged sequentially along the first direction 1, and the vertical projections of the common electrodes 151 on the plane where the drive electrode layer 140 is located at least partially overlap the drive electrodes 141 in a one-to-one correspondence. Further, a first alignment layer 161 is further disposed on a side of the first substrate 110 facing the dye liquid crystal layer 130, and a second alignment layer 162 is further disposed on a side of the second substrate 120 facing the dye liquid crystal layer 130; the first alignment layer 161 and the second alignment layer 162 have a same alignment direction in a same region.

In this embodiment, the difference between the ECB type liquid crystal cell and the VA type liquid crystal cell is that the first alignment layer 161 and the second alignment layer 162 are essentially aligned parallel. In addition, the liquid crystal molecules 131 in the viewing angle switching panel 100 are positive liquid crystals, and long axes of the positive liquid crystal molecules 131 tend to be parallel to a direction of the electric field under the action of the electric field.

Referring to FIG. 8, when the drive electrodes 141 are not applied with the drive voltages, affected by the parallel alignment, long axes of the liquid crystal molecules 131 in the dye liquid crystal layer 130 are parallel to the substrate, that is, in a horizontally lying state, and the dye molecules are also in a horizontally lying state. At this time, the light emitted from the liquid crystal display panel 200 is blocked by the horizontally lying dye molecules 132, and the switchable viewing angle display module is in the normal display state. As shown in FIG. 8, both eyes are indicated by a dotted line so as to indicate invisibility.

Referring to FIG. 9, in the first power-on state, the driver circuit 300 provides first drive voltages to the drive electrodes 141, that is, the common electrodes 151 and the drive electrodes 141 on the upper and lower sides of the dye liquid crystal layer 130 form a vertical electric field so that long axes of the positive liquid crystal molecules 131 tend to change from being parallel to the substrate to forming an angle with the substrate, where the angle depends on an electric field strength in a region where the liquid crystal molecules 131 are located, that is, on magnitudes of the drive voltages applied to the drive electrodes 141. It is to be understood that when sequentially increasing drive voltages are applied to the drive electrodes 141 along the first direction 1, deflection angles of the liquid crystal molecules 131 in regions corresponding to the drive electrodes 141 are also larger (the deflection here refers to deflection from a state of being parallel to the substrate to a state of being perpendicular to the substrate), the dye molecules 132 are also deflected with the driving of the liquid crystal molecules 131, and since long axes of the dye molecules 132 have a light absorbing effect, the larger deflection angles of the dye molecules 132 are, the smaller the light-emitting limitations on light emitted from a large angle are, that is, the smaller the limitations of regions corresponding to the drive electrodes 141 arranged sequentially along the first direction 1 on the light exit angle are. Therefore, in the first power-on state, the switchable viewing angle display module achieves a privacy protection state for a specific side, and it is to be understood that the privacy protection side depends on an arrangement direction of the drive electrodes, that is, a side facing away from the first direction is the privacy protection side. As shown in FIG. 9, a right eye is indicated by a dotted line so as to indicate that the viewing angle display is invisible, and a left eye is indicated by a solid line so as to indicate that the viewing angle display is visible.

Referring to FIG. 10, in the second power-on state, the driver circuit 300 provides second drive voltages to the drive electrodes 141, and since the second drive voltage is much greater than the first drive voltage, the common electrodes 151 and the drive electrodes 141 on the upper and lower sides of the dye liquid crystal layer 130 form a relatively large vertical electric field so that long axes of the positive liquid crystal molecules 131 change from being parallel to the substrate to being perpendicular to the substrate, and the dye molecules 132 are driven by the liquid crystal molecules 131 to become perpendicular to the substrate. At this time, the dye molecules 132 does not block light from the liquid crystal display panel 200. Therefore, in the second power-on state, the switchable viewing angle display module may achieve the normal display state. As shown in FIG. 10, both eyes are indicated by a solid line so as to indicate visibility.

According to the driving principle of the ECB type liquid crystal cell, it is to be known that the ECB type liquid crystal cell adopts a vertical electric field, and gradient drive voltages are loaded by the drive electrodes so that the liquid crystal molecules and the dye molecules achieve the same gradient deflection as in the VA type liquid crystal cell, thereby achieving privacy protection for a specific direction. For the IPS type or the FFS type liquid crystal cell, those skilled in the art know that the common electrodes and the drive electrodes are all disposed on a same substrate, and a drive voltage is applied so that a lateral electric field may be formed. However, since the lateral electric field formed by the common electrodes and the drive electrodes is not completely parallel to the substrate, based on this, those skilled in the art may design positions and applied signals of the common electrodes and the drive electrodes so that the electric field formed by each drive electrode has a vertical component, that is, through the IPS type or the FFS type liquid crystal cell structure, the liquid crystal molecules and the dye molecules in the IPS type or the FFS type liquid crystal cell structure are deflected from being parallel to the substrate in the power-on state, and gradient deflection angles are formed according to different drive voltages of drive electrodes, thereby generating different limitations on the light exit angles of the liquid crystal display panel and achieving privacy protection for a specific direction.

Figure 11:
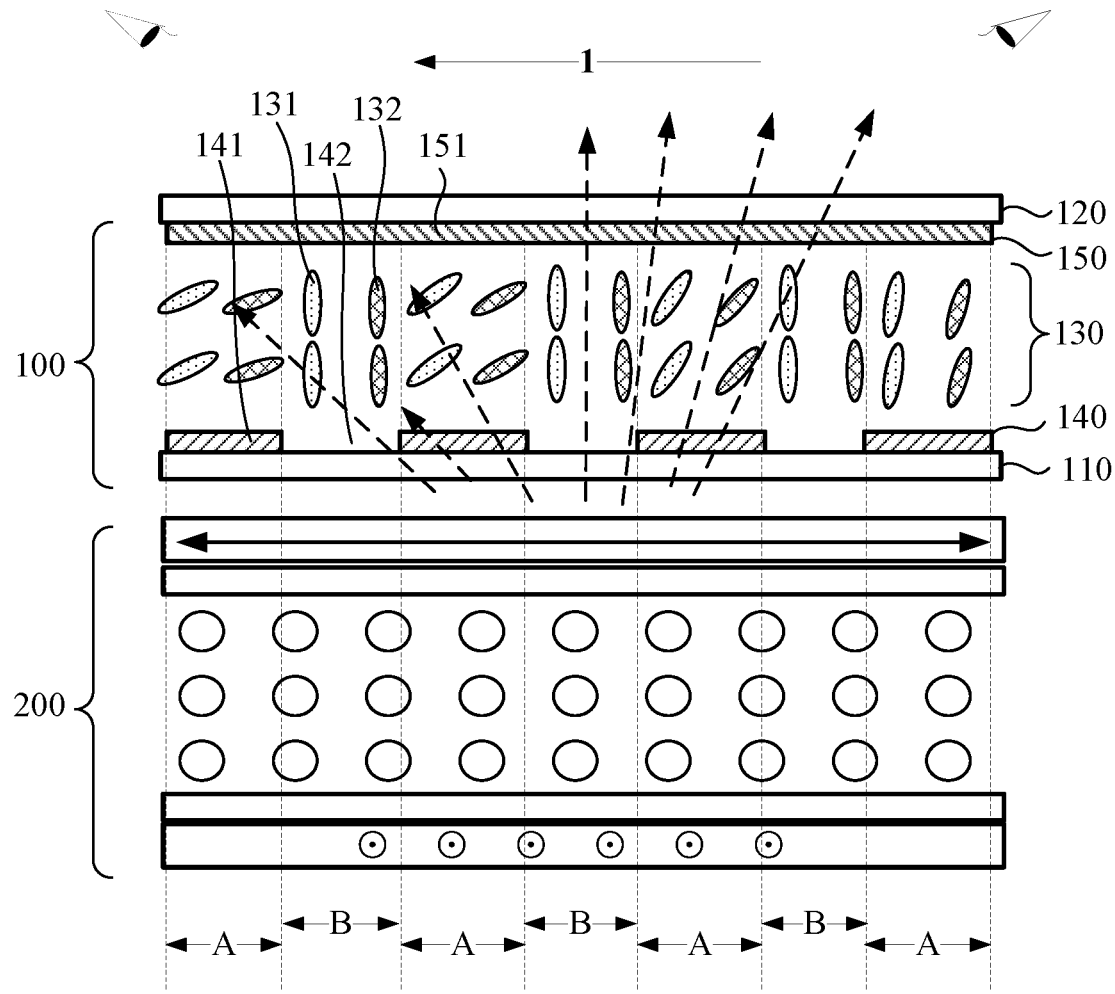
FIG. 11 is a structural diagram of another switchable viewing angle display module according to an embodiment of the present disclosure.

In addition, for the VA type liquid crystal cell and the ECB type liquid crystal cell, the common electrodes may be optionally set as a whole-surface structure. FIG. 11 is a structural diagram of another switchable viewing angle display module according to an embodiment of the present disclosure. Referring to FIG. 11, the viewing angle switching panel 100 further includes the common electrode layer 150 disposed on a side of the second substrate 120 facing the dye liquid crystal layer 130; the common electrode layer 150 includes common electrodes 151, and vertical projections of the drive electrodes 141 on a plane where the common electrode layer 150 is located are located within the common electrodes 151. Of course, in another embodiment of the present disclosure, the drive electrode layer 140 is disposed on a side of the second substrate 120 facing the dye liquid crystal layer 130, and the common electrode layer 150 is disposed on a side of the first substrate 110 facing the dye liquid crystal layer 130.

Figure 12:
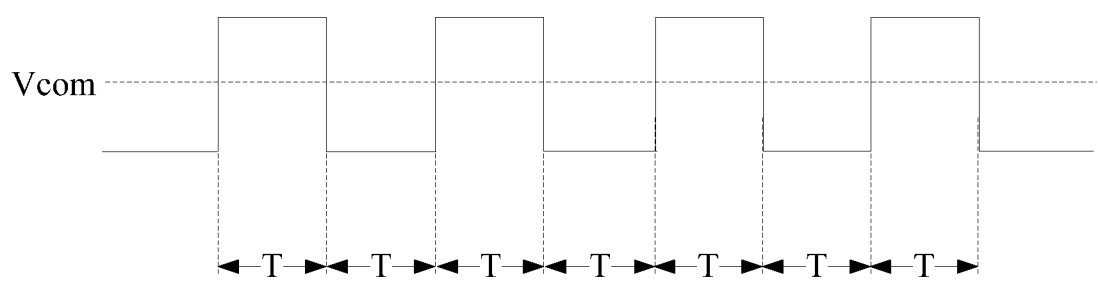
FIG. 12 is a timing diagram of a drive voltage of the switchable viewing angle display module in FIG. 1.

FIG. 12 is a timing diagram of a drive voltage of the switchable viewing angle display module in FIG. 1. Referring to FIGS. 1 and 12, in the embodiments of the present disclosure, the switchable viewing angle display module may include multiple drive cycles T, and in two adjacent drive cycles T, drive voltages provided by the driver circuit 300 to a same drive electrode 141 have opposite polarities and a same magnitude.

Those skilled in the art may understand that when in a fixed electric field for a long time, the liquid crystal molecules 131 are easily polarized by the electric field to present a fixed state, which affects a viewing angle switching function of the viewing angle switching panel 100. In the embodiments of the present disclosure, the drive voltages provided to the drive electrodes are reversed within two adjacent drive cycles T, that is, differences between the drive voltages of the drive electrodes 141 and common voltages Vcom of the common electrodes 151 in two adjacent drive cycles T have opposite signs and a same absolute value. In this manner, electric field directions between the drive electrodes 141 and the common electrodes 151 are reversed, and the liquid crystal molecules 131 and the dye molecules 132 may be deflected in two opposite directions in two adjacent drive cycles T so that the polarization of molecules is avoided, thereby ensuring the viewing angle switching function of the viewing angle switching panel 100 and increasing the service life of the viewing angle switching panel 100. In a specific implementation process, the common voltage Vcom of the common electrode 151 is 0 V. In this case, the drive voltages of the drive electrode 141 in two adjacent drive cycles T only need to have opposite polarities and same magnitudes. In addition, in this embodiment, the drive cycle T may be set according to a screen display cycle of the liquid crystal display panel, that is, a refresh frame. In an embodiment, the drive period T may be set to be an integer multiple of refresh frames. For example, when the drive cycle is equal to one period of refresh frame time, it indicates that every time the liquid crystal display panel 200 refreshes an image, the electric field of the viewing angle switching panel 100 is reversed once.

Figure 13:
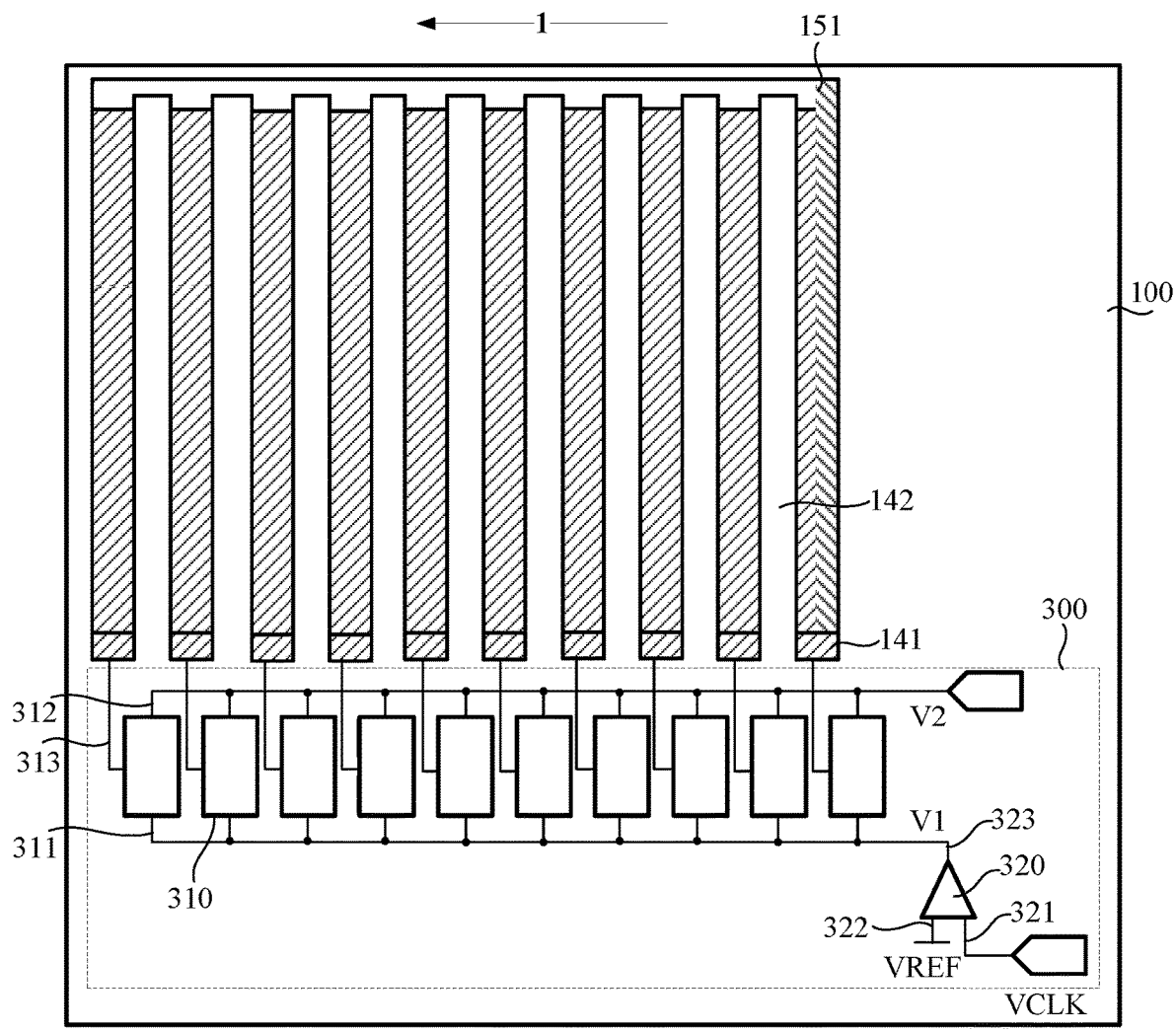
FIG. 13 is a structural diagram of another switchable viewing angle display module according to an embodiment of the present disclosure.

Based on the preceding privacy protection principle, the embodiments of the present disclosure are introduced below. FIG. 13 is a structural diagram of another switchable viewing angle display module according to an embodiment of the present disclosure. Referring to FIG. 13, in this embodiment, the driver circuit 300 includes multiple voltage dividing units 310, and the voltage dividing unit 310 includes a first voltage dividing input terminal 311, a second voltage dividing input terminal 312, and a voltage dividing output terminal 313; among the multiple voltage dividing units 310, first voltage dividing input terminals 311 receive first voltage signals, second voltage dividing input terminals 312 receive second voltage signals, and voltage dividing output terminals 313 electrically connected to the drive electrodes 141 in a one-to-one correspondence; and voltage dividing ratios of the voltage dividing output terminals 313 of the multiple voltage dividing units 310 are different.

Here, the two input terminals of the voltage dividing unit 310 are connected to the first voltage signal V1 and the second voltage signal V2, respectively and the voltage dividing output terminal 313 provides the drive voltage to the electrically connected drive electrode 141. In this manner, the drive voltage is essentially a mathematical function of the first voltage signal V1 and the second voltage signal V2, and since the voltage dividing ratios of the voltage dividing units 310 are different, drive voltage values are also different. Based on a gradual increase of the drive voltages received by the drive electrodes 141 arranged sequentially along the first direction 1 and based on the first voltage signal V1, the second voltage signal V2, and a voltage dividing function, the voltage dividing ratios of the voltage dividing units may be adjusted so that the drive voltages outputted by the voltage dividing units increase sequentially with an arrangement sequence of correspondingly connected drive electrodes 141 along the first direction 1.

With continued reference to FIG. 13, based on a design of gradually increasing the drive voltages based on the voltage dividing units, in the embodiments of the present disclosure, the driver circuit 300 may further include an operational amplifier unit 320, and the operational amplifier unit 320 includes a first operational amplifier input terminal 321, a second operational amplifier input terminal 322, and an operational amplifier output terminal 323. The first operational amplifier input terminal 321 of the operational amplifier unit 320 is connected to a clock signal, the second operational amplifier input terminal 322 is connected to a reference voltage signal VREF, and the operational amplifier output terminal 323 is connected to the first voltage dividing input terminal 311 or the second voltage dividing input terminal 312 of the voltage dividing unit 310. A voltage value of the reference voltage signal VREF is less than a high-level voltage of the clock signal VCLK and greater than a low-level voltage of the clock signal VCLK.

The operational amplifier unit 320 is essentially an operational amplifier circuit with a function of converting a case of directly providing the drive voltage to the drive electrode 141 to a case of providing the clock signal and converting the clock signal into the drive voltage, and based on a problem of a relatively weak voltage value of the clock signal, the amplifier circuit may amplify the clock signal to the drive voltage that satisfies a voltage value range requirement. Based on a design of the operational amplifier unit, a driver chip corresponding to the drive electrode may be simplified and only the clock signal needs to be provided so as to control the viewing angle switching panel.

Figure 14:
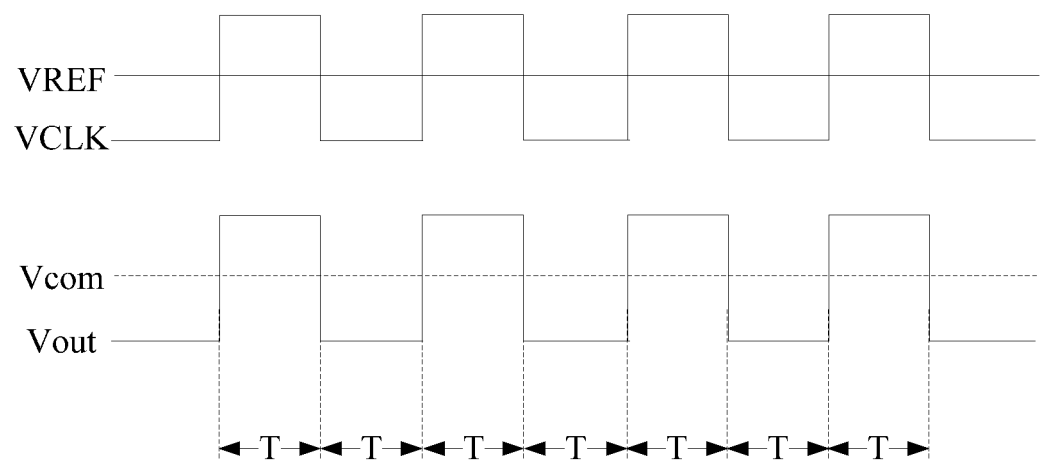
FIG. 14 is a timing diagram of input and output signals of an operational amplifier unit in the switchable viewing angle display module in FIG. 13.

FIG. 14 is a timing diagram of input and output signals of an operational amplifier unit in the switchable viewing angle display module in FIG. 13. Referring to FIG. 14, it is to be noted that the reference voltage signal VREF here needs to be designed according to high and low level values of the clock signal VCLK so that the reference voltage signal VREF is between the high and low level values. In this manner, in the case where a level of the clock signal VCLK is higher than a level of the reference voltage signal VREF, a positive-valued voltage signal is provided to each voltage dividing unit 310 so as to generate a positive-valued drive voltage; and in the case where a voltage of the clock signal VCLK is lower than a voltage of the reference voltage signal VREF, a negative-valued voltage signal is provided to each voltage dividing unit 310 so as to generate a negative-valued drive voltage. Therefore, the high and low levels of the clock signal VCLK may directly form reversed drive voltages. In this manner, the polarization of the liquid crystal molecules can be avoided, and the design of the driver chip that achieves a drive voltage reversion function is further avoided so that a driving process of providing the drive voltages to the drive electrodes is simpler. Similarly, the common voltage Vcom of the common electrode here may also be set to 0 V. In addition, the reference voltage VREF of the operational amplifier unit may be set to be the same as or different from the common voltage Vcom. It is to be understood that whether the drive voltage outputted by the operational amplifier unit is reversed is essentially determined by the reference voltage VREF. If the common voltage Vcom is set to be the same as the reference voltage VREF, the reversed drive voltage may directly form the reversed electric field so as to prevent the polarization of the liquid crystal molecules in a fixed electric field.

In the embodiments of the present disclosure, as shown in FIG. 13, the driver circuit 300 may be directly disposed on the viewing angle switching panel 100, that is, when the viewing angle switching panel 100 is prepared, the driver circuit 300 is prepared on the viewing angle switching panel 100 synchronously. In an embodiment, the driver circuit 300 may be disposed on a flexible circuit board.

Figure 15:
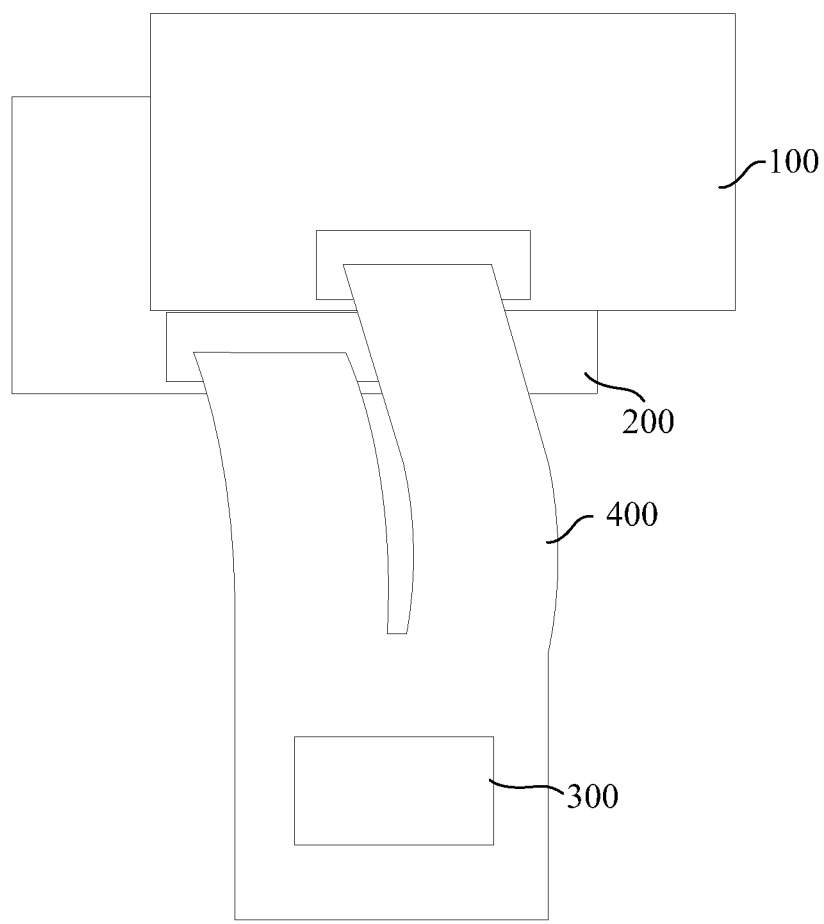
FIG. 15 is a structural diagram of another switchable viewing angle display module according to an embodiment of the present disclosure.

FIG. 15 is a structural diagram of another switchable viewing angle display module according to an embodiment of the present disclosure. Referring to FIG. 15, the switchable viewing angle display module further includes a flexible circuit board 400, where the flexible circuit board 400 is bound to the viewing angle switching panel 100 and/or the liquid crystal display panel 200 (the example flexible circuit board 400 in FIG. 15 has two connectors and the flexible circuit board 400 is connected to the viewing angle switching panel 100 and the liquid crystal display panel 200 at the same time), and the driver circuit 300 is disposed on the flexible circuit board 400.

It is to be understood that when the flexible circuit board 400 is bound to the viewing angle switching panel 100 and the liquid crystal display panel 200 through the connector, the viewing angle switching panel 100 and the liquid crystal display panel 200 are correspondingly provided with fan-out traces for inputting signals provided by the flexible circuit board 400 to corresponding electrodes or traces. Therefore, in the embodiments of the present disclosure, the driver circuit 300 may be electrically connected to the drive electrodes (not shown in the figure) through the fan-out traces on the viewing angle switching panel 100, so as to input different drive voltages to corresponding drive electrodes, respectively.

Figure 16:
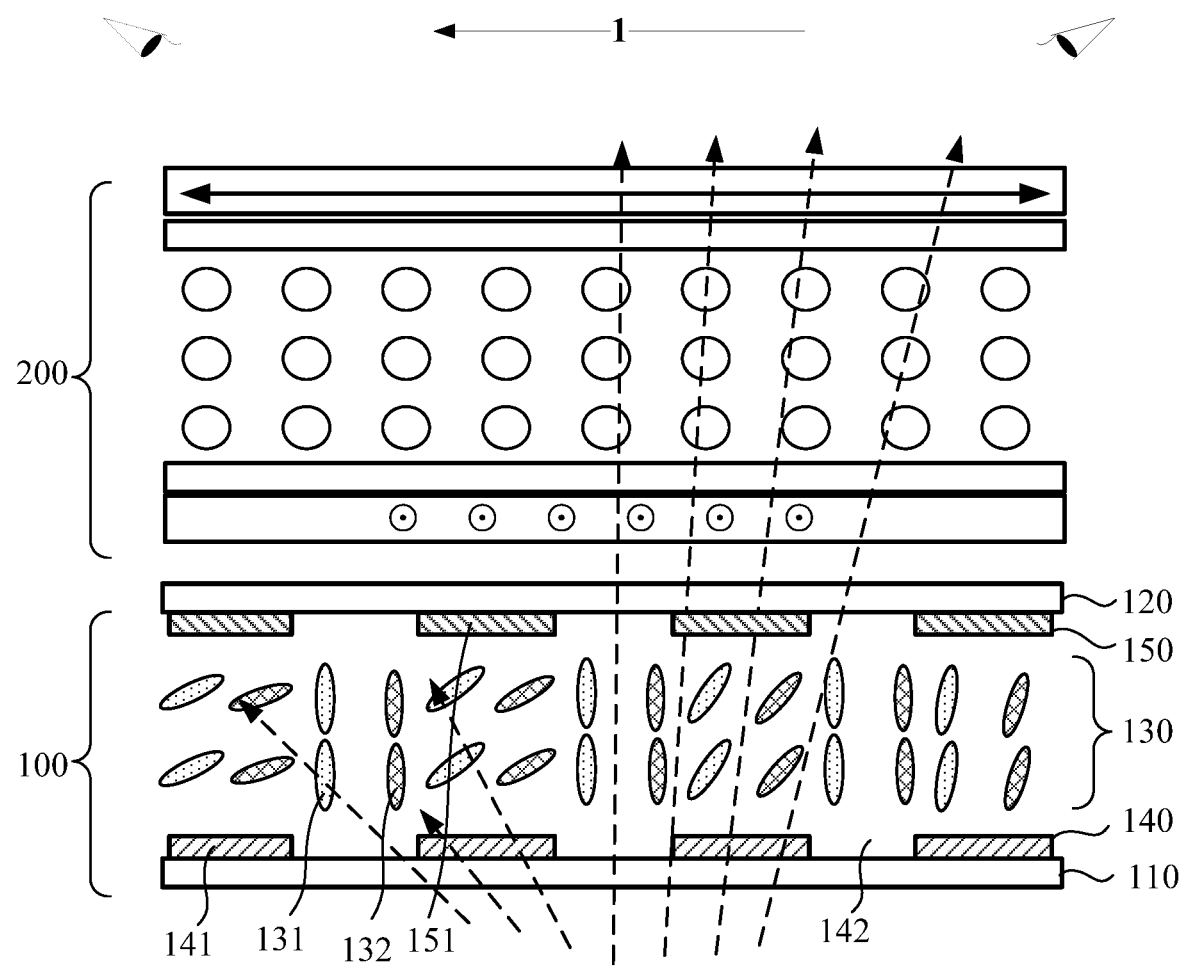
FIG. 16 is a structural diagram of another switchable viewing angle display module according to an embodiment of the present disclosure.

In addition, in the preceding embodiments, the viewing angle switching panel is disposed on the light-emitting side of the liquid crystal display panel, which is only an embodiment of the present disclosure. In other optional embodiments, the viewing angle switching panel may also be disposed on a light incident side of the liquid crystal display panel. FIG. 16 is a structural diagram of another switchable viewing angle display module according to an embodiment of the present disclosure. Referring to FIG. 16, the liquid crystal display panel 200 here represents a liquid crystal cell structure, the switchable viewing angle display module further includes a backlight module 500, and the viewing angle switching panel 100 is disposed on the light incident side of the liquid crystal display panel 200, which indicates that the viewing angle switching panel 100 is disposed between the liquid crystal display panel 200 and the backlight module 500. Before light emitted from the backlight module 500 is incident on the liquid crystal display panel 200, the viewing angle switching panel 100 may limit the viewing angle of the backlight so that the viewing angle is gradually narrowed in a specific direction, and then the liquid crystal display panel 200 may present an image display. It is to be understood that when the viewing angle switching panel 100 is disposed between the backlight module 500 and the liquid crystal display panel 200, an operation principle of the viewing angle switching panel 100 remains unchanged, the switching between the display mode and the privacy protection mode and the privacy protection for a specific direction may also be achieved, the shading of the liquid crystal display panel can be reduced, and the light extraction efficiency of the liquid crystal display panel is improved, which is conducive to reducing the brightness of the backlight module of the liquid crystal display panel, thereby effectively avoiding the problem of excessive power consumption of the liquid crystal display panel.

Figure 17:
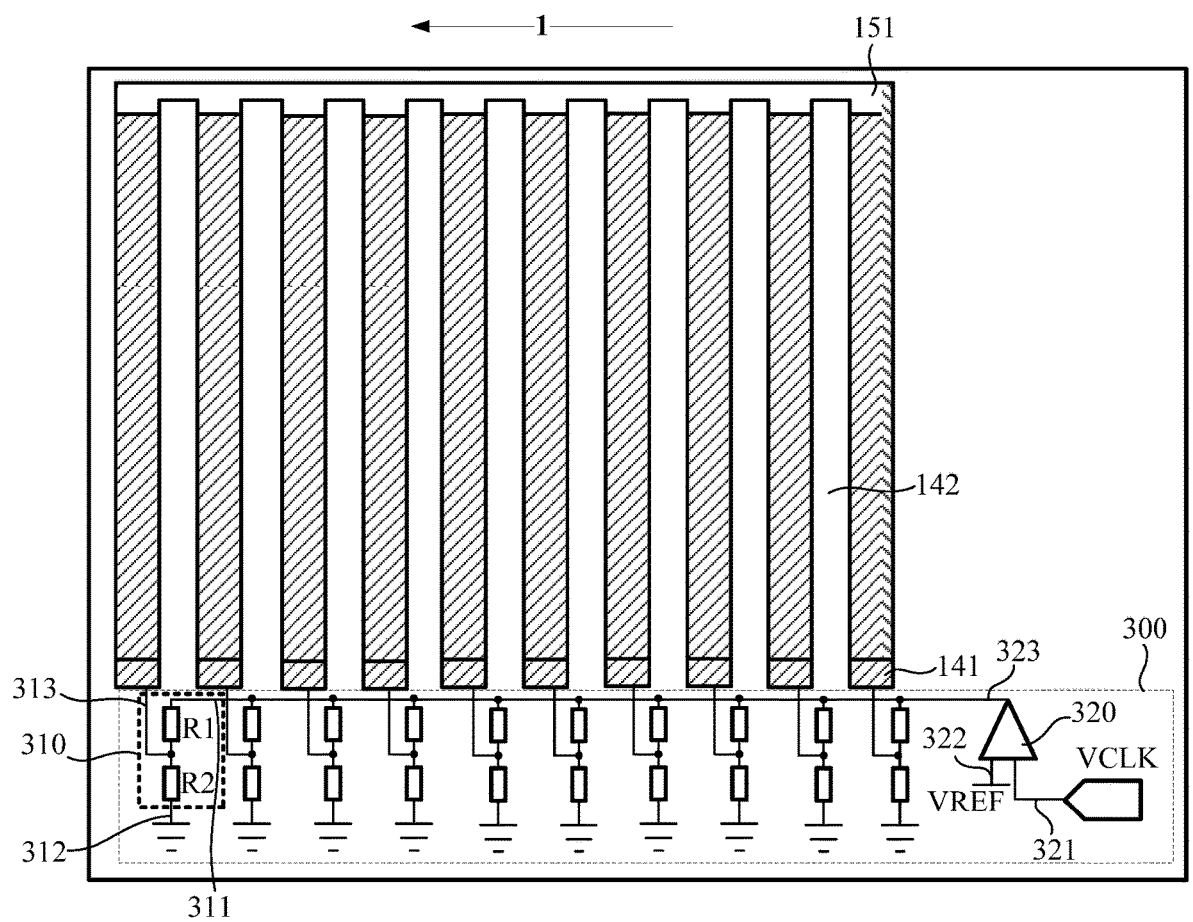
FIG. 17 is a structural diagram of another switchable viewing angle display module according to an embodiment of the present disclosure.

In the embodiments of the present disclosure, various embodiments are provided for the design of implementing different drive voltages by using the voltage dividing units, and corresponding introductions is made below. FIG. 17 is a structural diagram of another switchable viewing angle display module according to an embodiment of the present disclosure. Referring to FIG. 17, in this embodiment, the voltage dividing unit 310 includes a first resistor R1 and a second resistor R2, where a first terminal of the first resistor R1 is the first voltage dividing input terminal 311 and electrically connected to the operational amplifier output terminal 323, a second terminal of the first resistor R1 is the voltage dividing output terminal 313 and electrically connected to a first terminal of the second resistor R2 and the drive electrode 141, respectively, and a second terminal of the second resistor R2 is the second voltage dividing input terminal 312 and grounded; where ratios of resistance values of first resistors R1 to resistance values of second resistors R2 corresponding to the multiple drive electrodes 141 arranged along the first direction 1 decrease sequentially.

In this embodiment, resistors are essentially used for forming the voltage dividing unit 310, where the second terminal of the second resistor R2 is grounded. One of the input terminals of the voltage dividing unit 310, that is, the second voltage dividing input terminal 312, is essentially configured to receive grounding signals, and the two input terminals are simplified into a single signal input terminal, thereby simplifying the related circuit structure of input signals. It is to be noted here that in order that the second resistor R2 is grounded, a ground wire (not shown in the figure) needs to be disposed in the driver circuit 300, where the ground wire may be provided by an external driver chip. A wiring method of the ground wire is not limited in the embodiments of the present disclosure. In this embodiment, the resistance ratios of the two resistors are different so that different voltage dividing units 310 may have different voltage dividing ratios, and then the first voltage dividing input terminal 311 provides voltage signals so as to output the drive voltages according to different ratios, thereby providing the sequentially increasing drive voltages to the drive electrodes 141 arranged sequentially along the first direction 1.

It is to be understood that when the voltage dividing units 310 all accept the same input voltage signal Vin, the drive voltages Vout outputted by the voltage dividing units 310 satisfy that Vout=Vin×R1/R2. The following may be obtained from this formula: the resistance value of the first resistor R1 may be increased or the resistance value of the second resistor R2 may be decreased so as to increase the drive voltage.

Further, in an embodiment, the resistance values of the second resistors R2 in the voltage dividing units 310 may be the same, and the resistance values of the first resistors R1 corresponding to the multiple drive electrodes 141 arranged along the first direction 1 decrease sequentially. At this time, when the voltage dividing units 310 are prepared, it is only necessary to distinguish the resistance values of the first resistors R1 so that not only a circuit design can be simplified, but also the difficulty of preparation can be reduced.

In an actual preparation process, in the embodiments of the present disclosure, the driver circuit 300 may be disposed on the viewing angle switching panel 100, and specifically, the driver circuit 300 may be disposed in a step region of the viewing angle switching panel 100. The first resistor R1 and the second resistor R2 may be made of metal materials, and through magnetron sputtering, thermal deposition and other processes, metal patterns may be deposited on the step region of the viewing angle switching panel 100 so as to form the first resistor R1 and the second resistor R2.

In other embodiments of the present disclosure, the first resistors R1, the second resistors R2, and at least part of the drive electrodes 141 may also be prepared by using a same material and in a same layer. For example, the drive electrode 141 may be made of metal oxide materials such as indium tin oxide. In a process of preparing the drive electrodes 141 on a side of the first substrate 110 or the second substrate 120, the preceding resistor structure is simultaneously prepared on the first substrate 110 or the second substrate 120 in the same process, that is, the first resistor R1 and the second resistor R2 are prepared by using the metal oxide materials such as indium tin oxide. Generally, the metal oxide materials are generally prepared through magnetron sputtering, physical chemical vapor deposition and other processes, and a specific pattern is formed on the substrate through a mask. Based on this, for the first resistor R1 and the second resistor R2, opening patterns of the resistors may be added in the mask so that the two resistors may be formed simultaneously during the preparation process. Moreover, through a design of the resistor opening patterns, areas of the resistors may be adjusted, and the resistance values of the resistors may be distinguished by using the areas. In the embodiments of the present disclosure, the resistors are configured to be rectangular, and for the resistors in different voltage dividing units, the resistance values may be adjusted by changing lengths and widths of the rectangles.

Specifically, the areas of the first resistors R1 corresponding to the multiple drive electrodes 141 arranged along the first direction 1 decrease sequentially, and/or the areas of the first resistors R1 corresponding to the multiple drive electrodes 141 arranged along the first direction 1 increase sequentially. Based on this, the voltage dividing units with different voltage dividing ratios may be provided and correspondingly provide sequentially increasing drive voltages to the drive electrodes 141 arranged along the first direction 1. For example, the rectangular second resistors R2 may be configured to have same lengths and widths, that is, same areas, while the rectangular first resistors R1 may be configured to have same widths and sequentially increasing lengths so that the resistances of the first resistors R1 increase sequentially.

It is to be noted that the voltage dividing unit formed by resistors is not limited to two designed resistors nor limited to one terminal of one of the resistors being grounded. Those skilled in the art can make reasonable designs and modifications according to the embodiments of the present disclosure. No limitation is made here.

Figure 18:
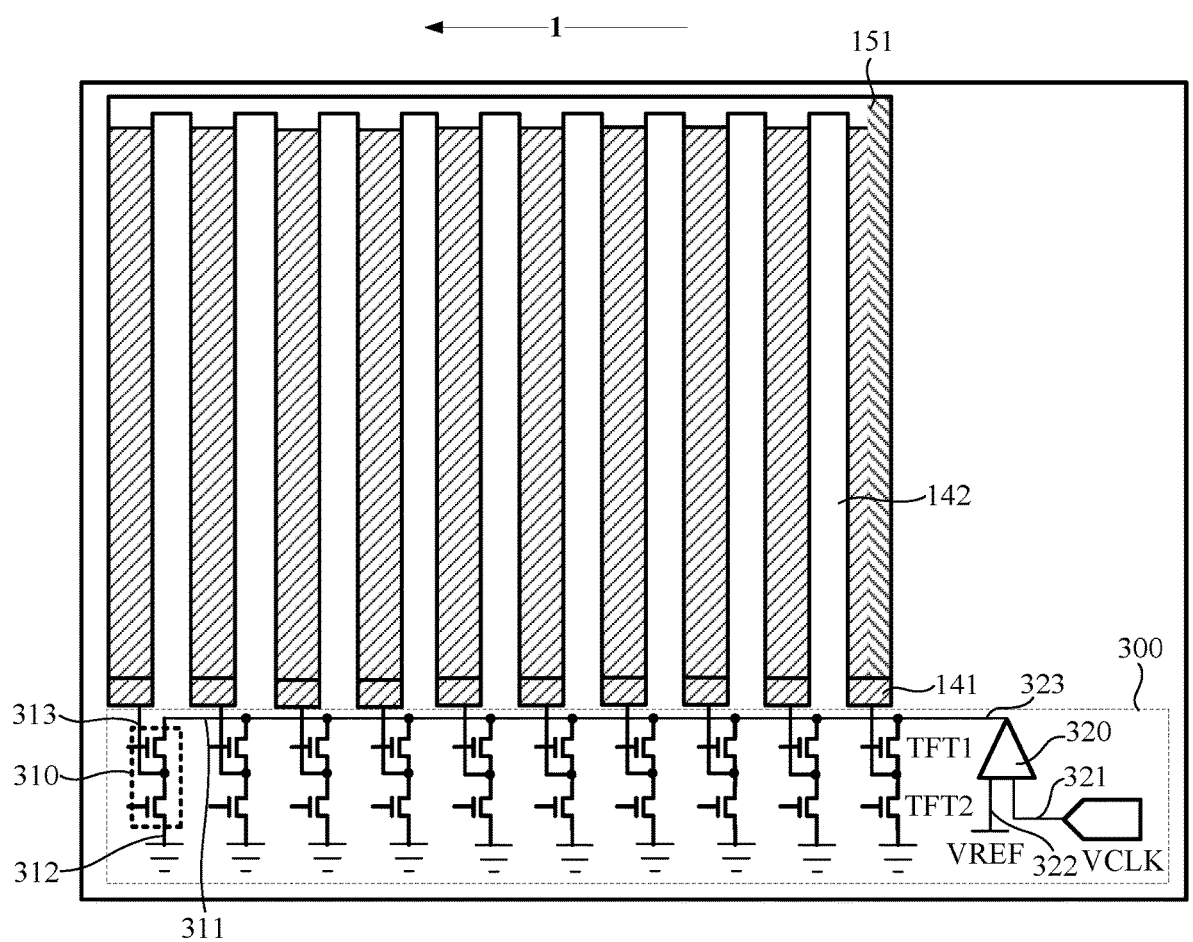
FIG. 18 is a structural diagram of another switchable viewing angle display module according to an embodiment of the present disclosure.

In addition to the voltage dividing unit structure by using resistors, other electrical devices such as thin film transistors may also be optionally used for design in other embodiments of the present disclosure. FIG. 18 is a structural diagram of another switchable viewing angle display module according to an embodiment of the present disclosure. Referring to FIG. 18, in another embodiment of the present disclosure, the voltage dividing unit 310 includes a first thin film transistor TFT1 and a second thin film transistor TFT2, where a first terminal of the first thin film transistor TFT1 is the first voltage dividing input terminal 311 and electrically connected to the operational amplifier output terminal 323, a second terminal of the first thin film transistor TFT1 is the voltage dividing output terminal 313 and electrically connected to a first terminal of the second thin film transistor TFT2 and the drive electrode 141, respectively, and a second terminal of the second thin film transistor TFT2 is the second voltage dividing input terminal 312 and grounded; where ratios of equivalent resistances of first thin film transistors TFT1 to equivalent resistances of second thin film transistors TFT2 corresponding to the multiple drive electrodes 141 arranged along the first direction 1 decrease sequentially.

In this embodiment, in terms of a principle of outputting different drive voltages, the thin film transistor may be essentially equivalent to the resistor, that is, in this embodiment, the equivalent resistance of the thin film transistor is essentially used for achieving voltage division, and the principle may refer to the preceding voltage division principle of the resistor, which is not repeated here.

It is to be noted here that, as shown in FIG. 18, the equivalent resistances of the two thin film transistors in each voltage dividing unit 310 also depend on control signals of a control terminal to a certain extent. Based on this, the ratio of equivalent resistances of the thin film transistors in each voltage dividing unit 310 may be adjusted through the control signals. In an embodiment, a gate of each first thin film transistor TFT1 may be connected to a same control signal line, and a gate of each second thin film transistor TFT2 may be connected to a same control signal line. Using the two control signal lines, magnitudes of the two control signals may be adjusted as required, thereby controlling the ratio of equivalent resistances of the two thin film transistors in each voltage dividing unit 310.

Additionally, it is to be noted that, in this embodiment, the voltage dividing unit 310 is configured to be made of thin film transistors so that using the thin film transistors, not only different ratios of voltage division are achieved, but also whether to provide the drive voltages to the drive electrodes 141 is controlled. It is to be understood that, on the premise that the number and spacing of the drive electrodes are fixed, when the thin film transistor is used for providing the drive voltage to the drive electrode, it is feasible to freely control whether to input a drive voltage signal to a corresponding drive electrode. Exemplarily, the drive voltages may be selectively provided to all the drive electrodes, the drive voltages may be selectively provided to the drive electrodes of odd or even bits, and the drive voltages may be provided to at least two drive electrodes spaced by a same number. Exemplarily, control terminals of thin film transistors corresponding to drive electrodes of odd bits are connected to a same control line, and control terminals of thin film transistors corresponding to drive electrodes of even bits are connected to another control line. Using control signals of the two control lines, all drive electrodes may be controlled to be powered on, or only the drive electrodes of odd bits or only the drive electrodes of even bits may be controlled to be powered on. In the case where all the drive electrodes are powered on, a distance between two adjacent drive electrodes is a width of a single interval 142; and in the case where only the drive electrodes of odd bits are powered on, the distance between two adjacent drive electrodes of odd bits is a total width of two intervals 142 and one drive electrode 141. Based on this, it is to be understood that due to the difference in the interval between the drive electrodes that actually input the drive voltages, the degrees of limitations on the light exit angle of the light emitted from the liquid crystal display panel are also different, and the achieved privacy protection effects are also different. On the contrary, the degrees of light transmission of the liquid crystal display panel 200 for the emitted light are also different. According to a design of a thin film transistor control circuit, corresponding control signals are provided so that the switchable viewing angle display module may achieve different levels of privacy protection effects and different levels of display effects. In this manner, the privacy protection and the display effect are achieved at the same time, thereby providing conditions and possibilities for adjusting the degree of privacy protection and the display state.

Figure 19:
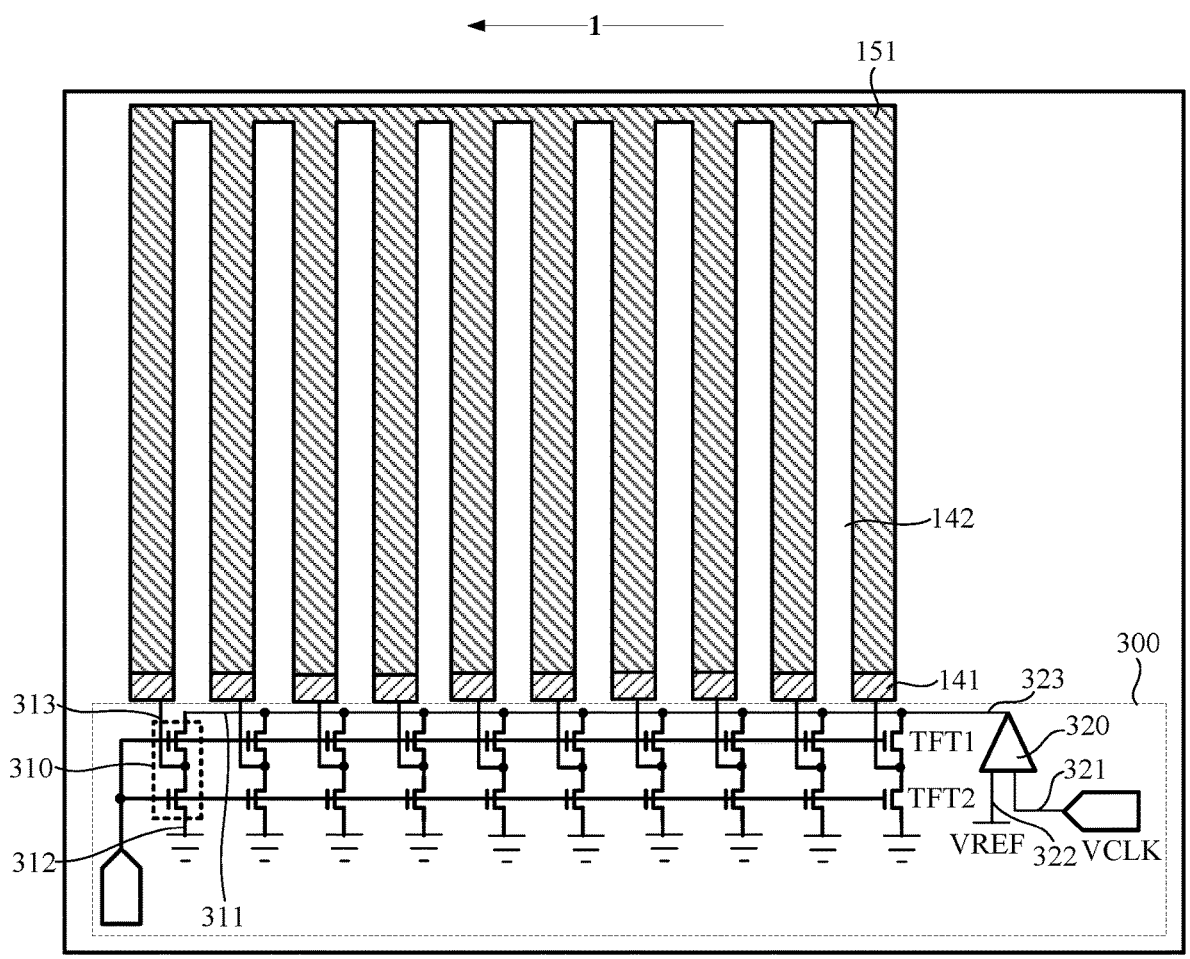
FIG. 19 is a structural diagram of another switchable viewing angle display module according to an embodiment of the present disclosure.

FIG. 19 is a structural diagram of another switchable viewing angle display module according to an embodiment of the present disclosure. Referring to FIG. 19, in another embodiment of the present disclosure, the voltage dividing unit 310 also includes the first thin film transistor TFT1 and the second thin film transistor TFT2, where the first terminal of the first thin film transistor TFT1 is the first voltage dividing input terminal 311 and electrically connected to the operational amplifier output terminal 323, the second terminal of the first thin film transistor TFT1 is the voltage dividing output terminal 313 and electrically connected to the first terminal of the second thin film transistor TFT2 and the drive electrode 141, respectively, and the second terminal of the second thin film transistor TFT2 is the second voltage dividing input terminal 312 and grounded. The gate of the first thin film transistor TFT1 and the gate of the second thin film transistor TFT2 are both connected to a same control line, and along the first direction 1, ratios of width-to-length ratios of the first thin film transistors TFT1 to width-to-length ratios of the second thin film transistors TFT2 corresponding to the multiple drive electrodes 141 arranged along the first direction 1 increase sequentially.

Those skilled in the art can understand that the equivalent resistance of the thin film transistor is essentially determined by the width-to-length ratio of the thin film transistor, and the larger the width-to-length ratio is, the smaller the equivalent resistance of the thin film transistor is. Along the first direction 1, the ratios of the width-to-length ratios of the first thin film transistors TFT1 to the width-to-length ratios of the second thin film transistors TFT2 increase sequentially. In this manner, the ratio of equivalent resistances decreases sequentially, and the drive voltages outputted by the voltage dividing units 310 are larger so that the deflections of the liquid crystal molecules and the dye molecules arranged along the first direction 1 gradually increase, and a light-emitting viewing angle on a side facing the first direction 1 gradually decreases, thereby achieving the privacy protection on the side facing the first direction 1.

Figure 20:
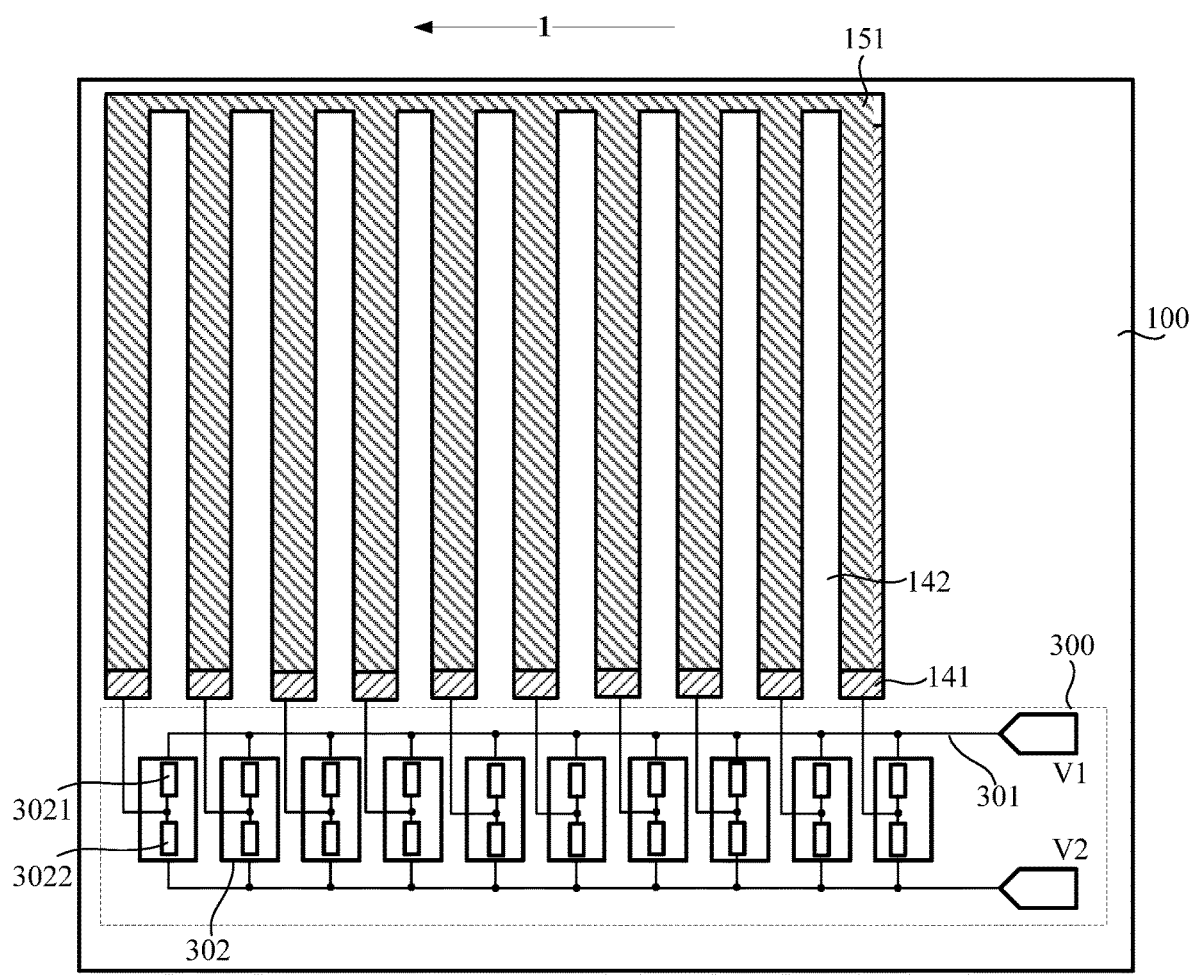
FIG. 20 is a top diagram of another switchable viewing angle display module according to an embodiment of the present disclosure.

Based on the same concept, the embodiments of the present disclosure further provide a switchable viewing angle display module. FIG. 20 is a top diagram of another switchable viewing angle display module according to an embodiment of the present disclosure. Referring to FIG. 20, the switchable viewing angle display module includes a viewing angle switching panel 100 and a liquid crystal display panel (not shown in the figure), where the viewing angle switching panel 100 is disposed on a light-emitting side of the liquid crystal display panel; and the viewing angle switching panel 100 includes a first substrate and a second substrate, a dye liquid crystal layer, and a drive electrode layer, where the dye liquid crystal layer is disposed between the first substrate and the second substrate, and the drive electrode layer is disposed on a side of the first substrate and/or the second substrate facing the dye liquid crystal layer, where the drive electrode layer includes multiple drive electrodes 141 arranged sequentially along a first direction 1, an interval 142 of a preset length is set between two adjacent drive electrodes 141, and the first direction 1 is parallel to a light-emitting surface of the switchable viewing angle display module; where the switchable viewing angle display module further includes a driver circuit 300, where the driver circuit 300 includes a control bus 301 and multiple electrical device combinations 302, the electrical device combination 302 includes a first electrical device 3021 and a second electrical device 3022, and the control bus is electrically connected to a control signal port V1; in each electrical device combination 302, a first terminal of the first electrical device 3021 is electrically connected to the control bus, a second terminal of the first electrical device 3021 is electrically connected to a first terminal of the second electrical device 3022, and a second terminal of the second electrical device 3022 is electrically connected to a common signal port V2; among the electrical device combinations 302, second terminals of first electrical devices 3021 are also electrically connected to the drive electrodes 141 arranged sequentially along the first direction 1 in a one-to-one correspondence; and among the electrical device combinations 302 corresponding to the drive electrodes 141 arranged sequentially along the first direction 1, resistance ratios of the first electrical devices to second electrical devices decrease sequentially.

In this embodiment, the resistance ratios of the first electrical devices 3021 and the second electrical devices 3022 in the electrical device combinations 302 decrease sequentially. Similarly, sequentially increasing drive voltages may be provided to the drive electrodes 141 sequentially arranged along the first direction 1 so that the drive electrodes 141 may from sequentially enhanced electric fields, and the degrees of deflections of the liquid crystal molecules and the dye molecules in the dye liquid crystal layer 130 gradually increase, thereby forming different degrees of limitations on the light exit angle and achieving the privacy protection facing the first direction 1, which is not repeated here. In addition, regarding the structure of the viewing angle switching panel 100 except the driver circuit, this embodiment may also be modified with reference to the preceding embodiments, which is also not limited here.

Figure 21:
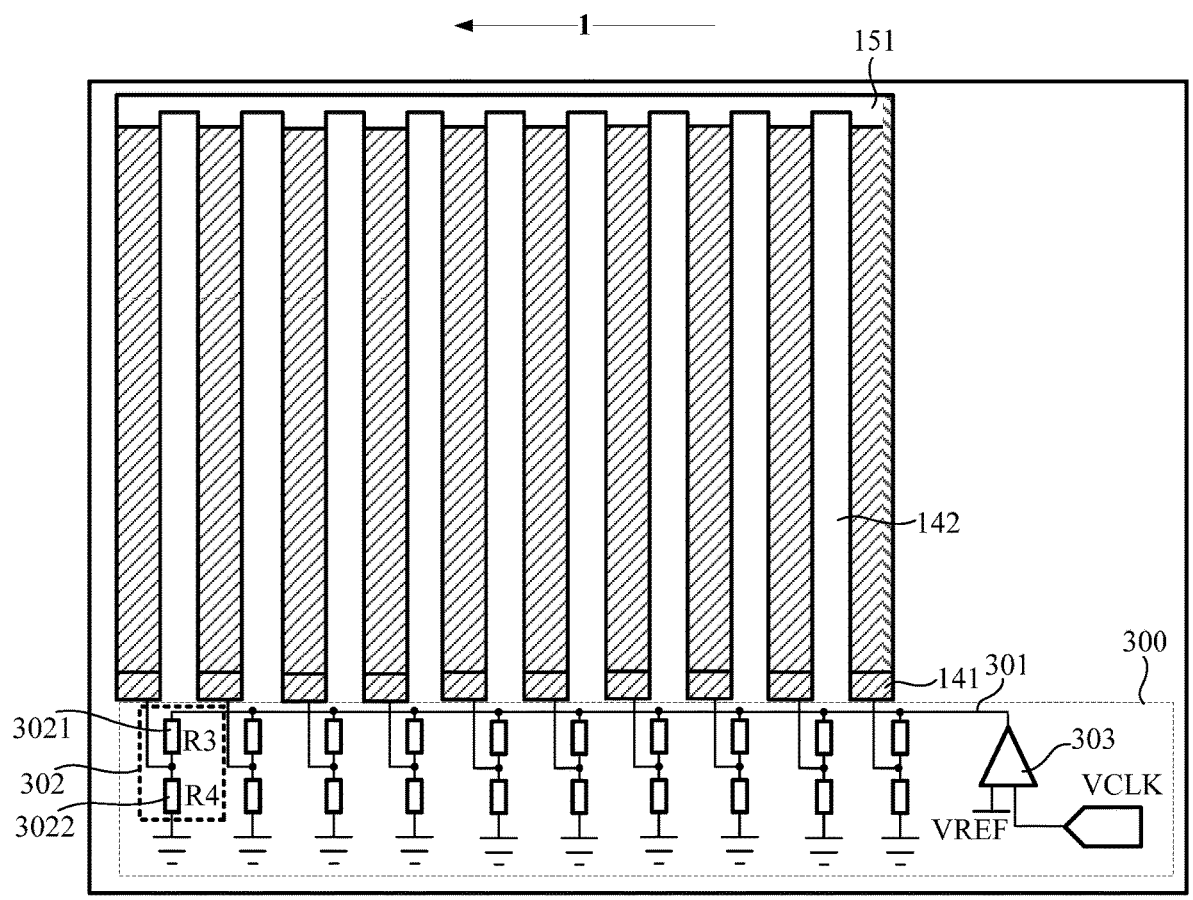
FIG. 21 is a structural diagram of another switchable viewing angle display module according to an embodiment of the present disclosure.

FIG. 21 is a structural diagram of another switchable viewing angle display module according to an embodiment of the present disclosure. Referring to FIG. 21, in an embodiment, the driver circuit 300 further includes an operational amplifier 303, a forward input terminal or a reverse input terminal of the operational amplifier 303 is electrically connected to the control signal port, the reverse input terminal or the forward input terminal of the operational amplifier 303 is electrically connected to a reference signal port, and an output terminal of the operational amplifier 303 is electrically connected to the control bus 301; and the control signal port provides a clock signal VCLK, the reference signal port provides a reference voltage VREF, and a voltage value of the reference voltage VREF is less than a high-level voltage of the clock signal VCLK and greater than a low-level voltage of the clock signal VCLK.

With continued reference to FIG. 21, in an embodiment, in the electrical device combination 302, the first electrical device 3021 may include a third resistor R3, the second electrical device 3022 may include a fourth resistor R4, a first terminal of the third resistor R3 is electrically connected to the output terminal of the operational amplifier 303, a second terminal of the third resistor R3 is electrically connected to a first terminal of the fourth resistor R4 and the drive electrode 141, and a second terminal of the fourth resistor R4 is grounded; where resistance ratios of third resistors R3 to fourth resistors R4 corresponding to the multiple drive electrodes 141 arranged along the first direction 1 decrease sequentially.

In an embodiment, the resistance values of the fourth resistors R4 in the voltage dividing units 302 may be the same, and the resistance values of the third resistors R3 corresponding to the multiple drive electrodes 141 arranged along the first direction 1 decrease sequentially.

In addition, in an embodiment, the driver circuit 300 may be disposed on the viewing angle switching panel 100; and the third resistors R3, the fourth resistors R4, and at least part of the drive electrodes 141 are prepared by using a same material and in a same layer. In the embodiments of the present disclosure, exemplarily, the metal oxide material such as indium tin oxide is used for preparing the drive electrodes 141, the third resistors R3, and the fourth resistors R4.

Figure 22:
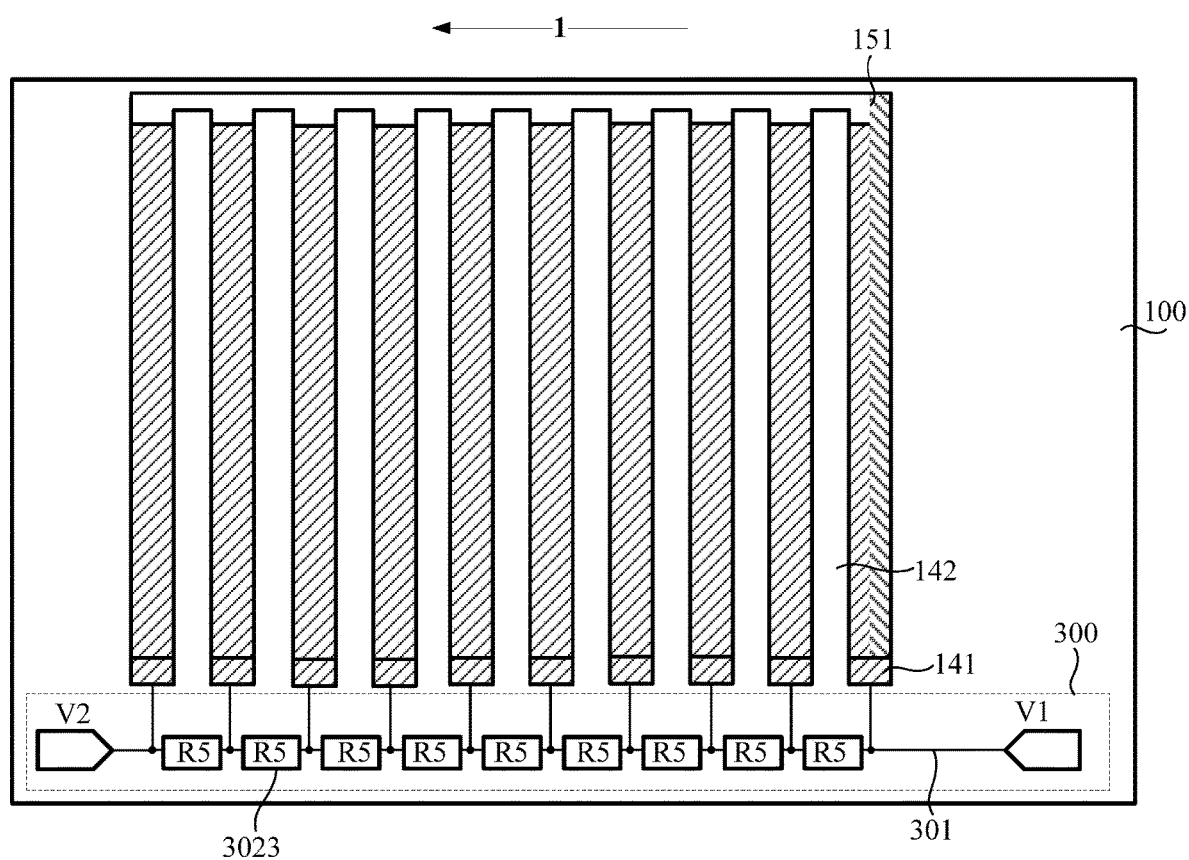
FIG. 22 is a structural diagram of another switchable viewing angle display module according to an embodiment of the present disclosure.

FIG. 22 is a structural diagram of another switchable viewing angle display module according to an embodiment of the present disclosure. Referring to FIG. 22, in an embodiment, the driver circuit 300 includes a control bus 301 and multiple third electrical devices 3023, the multiple third electrical devices 3023 are sequentially connected in series with the control bus 301, the multiple drive electrodes 141 arranged sequentially along the first direction 1 are electrically connected to the control bus 301 respectively, and connection nodes of the drive electrodes 141 and the control bus 301 and the third electrical devices 3023 are sequentially and alternately arranged.

In this embodiment, among the multiple third electrical devices 3023 sequentially connected in series, each third electrical device 3023 generates a voltage drop so that voltages at the connection nodes of the drive electrodes 141 and the control bus 301 decrease sequentially along the first direction 1. In other words, sequentially decreasing drive voltages may be provided to the drive electrodes 141 through voltage signals provided by the control bus 301 and the voltage drop at the multiple third electrical devices 3023. At this time, the drive electrodes 141 may form a gradually decreasing electric field along the first direction 1 so that the deflections of the liquid crystal molecules and the dye molecules gradually decrease along the first direction 1, and the limitation on the viewing angle is larger in a direction facing away from the first direction 1, thereby achieving the privacy protection in the direction facing away from the first direction 1.

It is to be noted that in this embodiment, the plurality of third electrical devices 3023 are essentially connected in series with the control bus 301 between the control signal port V1 and the common signal port V2, a current loop may be formed between the control signal port V1 and the common signal port V2, and the drive electrodes 141 are connected to the control bus 301 and can receive voltage signals of corresponding connection nodes. In other words, the connection nodes on the control bus 301 may provide gradient drive voltages to the corresponding drive electrodes 141 so that multiple electric fields with gradient intensities are achieved and the deflection angles of the liquid crystal molecules at different positions are in a gradient state.

With continued reference to FIG. 22, in an embodiment, the third electrical device 3023 includes a fifth resistor R5, and fifth resistors R5 are sequentially connected in series with the control bus 301, and the connection nodes of the drive electrodes 141 and the control bus 301 and the fifth resistors R5 are sequentially and alternately arranged. In addition, the driver circuit 300 may also be disposed on the viewing angle switching panel 100; and the third resistors R5 and at least part of the drive electrodes 141 are prepared by using a same material and in a same layer.

It is to be noted that the third electrical devices 3023 here do not necessarily refer to electrical devices with same resistance values, and the resistance values may be set to be the same or different. It is to be understood that when the resistance values are the same, the third electrical devices 3023 have the same voltage drop, the drive voltages provided to the drive electrodes 141 along the first direction 1 decrease sequentially with an equal gradient, and the deflection effects on the liquid crystal molecules also have a gradation effect with an equal gradient so that the privacy protection effect of the liquid crystal panel is more continuous and a sudden change of display brightness can also be avoided.

Figure 23:
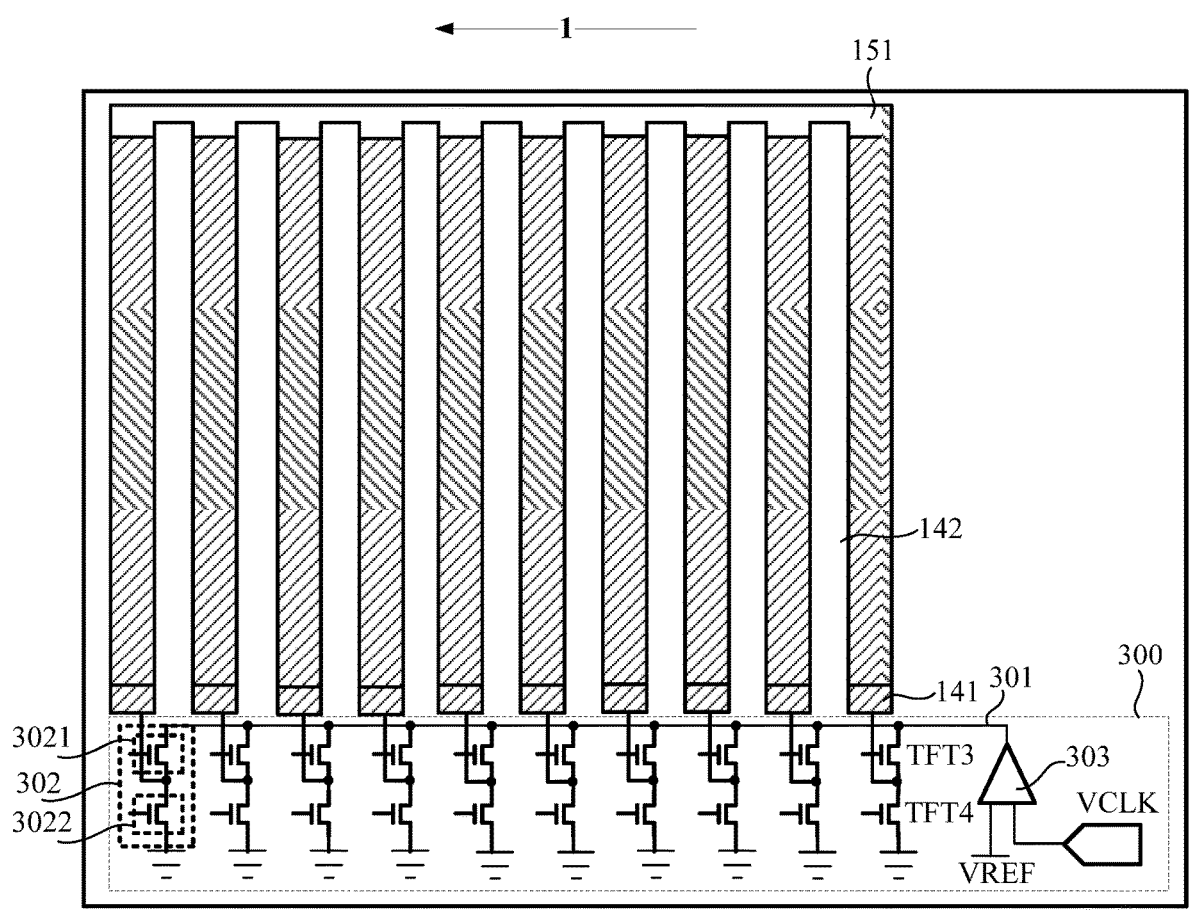
FIG. 23 is a structural diagram of another switchable viewing angle display module according to an embodiment of the present disclosure.

FIG. 23 is a structural diagram of another switchable viewing angle display module according to an embodiment of the present disclosure. Referring to FIG. 23, in this embodiment, the first electrical device 3021 may include a third thin film transistor TFT3, the second electrical device 3022 may include a fourth thin film transistor TFT4, a first terminal of the third thin film transistor TFT3 is electrically connected to the output terminal of the operational amplifier 303, a second terminal of the third thin film transistor TFT3 is electrically connected to a first terminal of the fourth thin film transistor TFT4 and the drive electrode 141, respectively, and a second terminal of the fourth thin film transistor TFT4 is grounded; where ratios of equivalent resistances of third thin film transistors TFT3 to equivalent resistances of fourth thin film transistors TFT4 corresponding to the multiple drive electrodes 141 arranged along the first direction 1 decrease sequentially.

In an embodiment, ratios of width-to-length ratios of the third thin film transistors TFT3 to width-to-length ratios of the fourth thin film transistors TFT4 corresponding to the multiple drive electrodes 141 arranged sequentially along the first direction 1 increase sequentially. As shown in FIG. 22, the operation principle, implementation, and alternate solutions of the embodiment in which the operational amplifier and the electrical device combination formed by the thin film transistors are used are the same as those of the previous embodiments (the embodiments shown in FIGS. 18 and 19) in which the thin film transistors are used, which are not repeated here.

Figure 24:
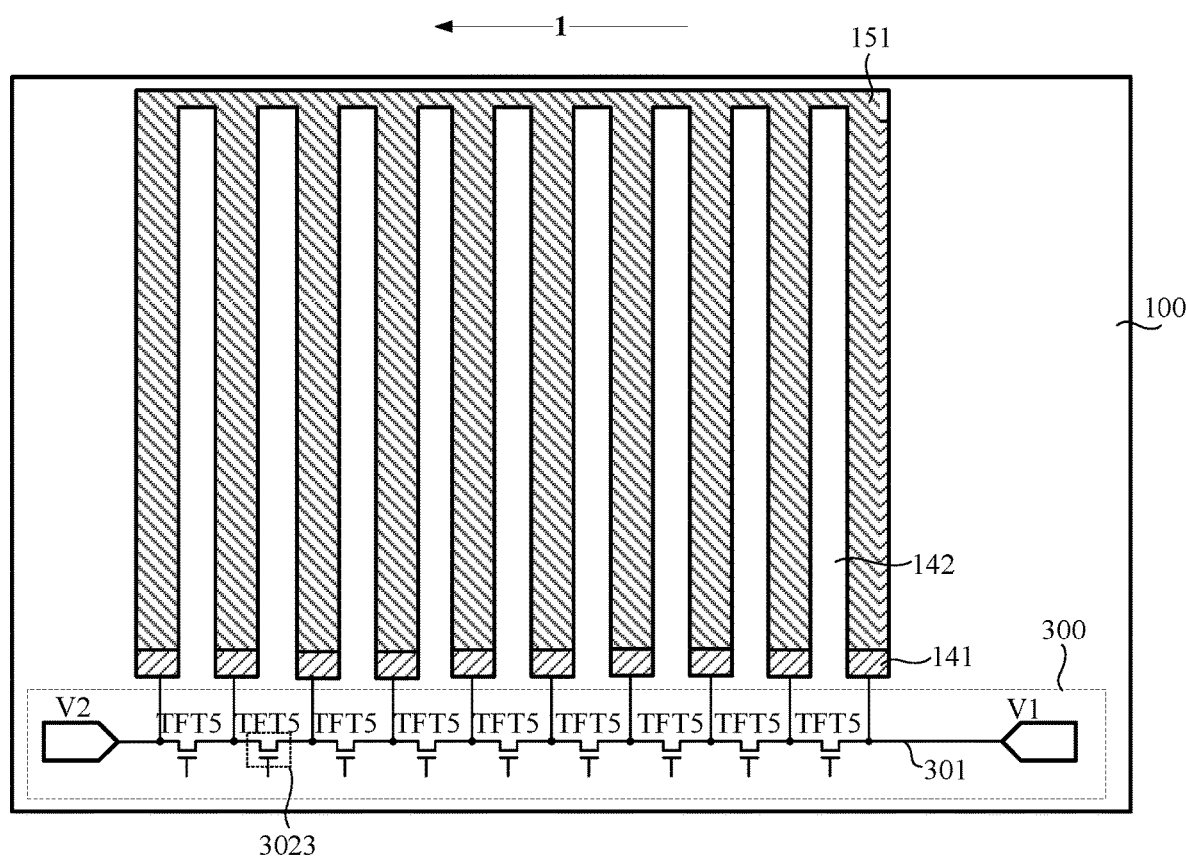
FIG. 24 is a structural diagram of another switchable viewing angle display module according to an embodiment of the present disclosure.

FIG. 24 is a structural diagram of another switchable viewing angle display module according to an embodiment of the present disclosure. Referring to FIG. 24, in this embodiment, the driver circuit 300 includes a control bus 301 and multiple third electrical devices 3023, the multiple third electrical devices 3023 are sequentially connected in series with the control bus 301, the multiple drive electrodes 141 arranged sequentially along the first direction 1 are electrically connected to the control bus 301 respectively, and connection nodes of the drive electrodes 141 and the control bus 301 and the third electrical devices 3023 are sequentially and alternately arranged. In addition, the third electrical device 3023 includes a fifth thin film transistor TFT5, fifth thin film transistors TFT5 are sequentially connected in series with the control bus 301, and the connection nodes of the drive electrodes 141 and the control bus 301 and the fifth thin film transistors TFT5 are sequentially and alternately arranged. It is to be noted that, in the structure shown in FIG. 24, gates of the fifth thin film transistors TFT5 may all be electrically connected to a same signal terminal or may be electrically connected to different signal terminals.

Similarly, the fifth thin film transistors TFT5 may optionally adopt same design parameters, for example, same width-to-length ratios. At this time, equivalent resistance values of the fifth thin film transistors TFT5 are the same. Different design parameters may also be adopted. In the case where the same width-to-length ratios are adopted, when turned on, the fifth thin film transistors TFT5 have the same voltage drop and can provide gradient drive voltages with an equal gradient to the drive electrodes 141, thereby ensuring a uniform gradient of the privacy protection effect and the display effect. In addition, multiple fifth thin film transistors TFT5 are also essentially connected in series with the control bus 301 between the control signal port V1 and the common signal port V2 so that the drive electrodes 141 may acquire sequentially gradient drive voltages according to corresponding connection nodes on the control bus 301 and generate multiple electric fields with gradient intensities, and the deflection angles of the liquid crystal molecules at different positions are in a gradient state.

Figure 25:
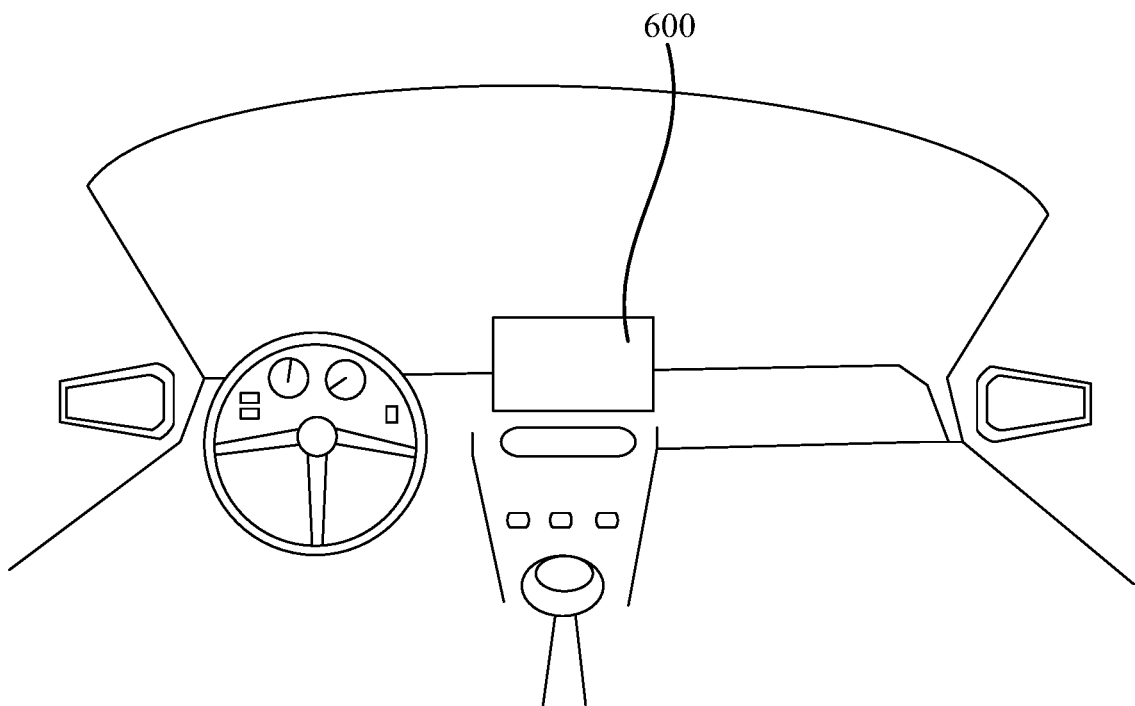
FIG. 25 is a partial schematic diagram of a vehicle according to an embodiment of the present disclosure.

An embodiment of the present disclosure further provides a vehicle. FIG. 25 is a partial schematic diagram of a vehicle according to an embodiment of the present disclosure. Referring to FIG. 25, the vehicle includes any switchable viewing angle display module 600 provided in the embodiments of the present disclosure. In an embodiment, the vehicle may be a vehicle that needs to be configured with on-board display, such as an automobile, a train, and an airplane. The switchable viewing angle display module 600 may specifically be a vehicle machine and an instrument panel in a vehicle such as an automobile.

It is to be understood that for the vehicle equipped with on-board display such as an automobile, the switchable viewing angle display module provided in the embodiments of the present disclosure may satisfy requirements of a user for switching between a normal display mode and a privacy protection display mode of the vehicle machine in different scenarios. For example, in a parking state, the switchable viewing angle display module provided in the embodiments of the present disclosure may be switched to a wide viewing angle mode, that is, the normal display mode, and viewed by users in a driving seat and a sub driving seat. In a driving state, the switchable viewing angle display module provided in the embodiments of the present disclosure may be switched to a narrow viewing angle mode, that is, the privacy protection mode, so as to achieve privacy protection for the driving seat and prevent the following case: hidden dangers are caused to driving safety due to a driver distracted from watching the vehicle machine.

In the embodiments of the present disclosure, the vehicle includes a main driving seat and a sub driving seat. Based on an application scenario of privacy protection for the driving seat, in the switchable viewing angle display module provided in the embodiments of the present disclosure, the first direction may be configured to be from the sub driving seat to the main driving seat or from the main driving seat to the sub driving seat, that is, while it is ensured that the drive electrodes in the viewing angle switching panel are sequentially arranged along the direction from the sub driving seat to the main driving seat, sequentially increasing drive voltages are received by the drive electrodes along the direction from the sub driving seat to the main driving seat. Therefore, the switchable viewing angle display module can achieve one-side privacy protection for the main driving seat, while for the sub driving seat, since the drive voltages of the drive electrodes are relatively small, the effects of the drive electrodes on the light exit angle are relatively small. Not only it is ensured that the vehicle machine can be viewed normally on a side of the sub driving seat, but also it is ensured that the vehicle machine is in normal display brightness. In this manner, the following problem is solved: an existing vehicle machine not only has a privacy protection effect on the main driving seat but also causes a viewing angle limitation on the side of the sub driving seat and affects normal viewing.

In addition, the embodiments of the present disclosure further provide an application mode of the switchable viewing angle display module in the vehicle. In an embodiment, on the basis that the switchable viewing angle display module 600 provided in the embodiments of the present disclosure is located at a position of a center console in a cab, the first direction is a direction by rotating a direction that is from the sub driving seat to the main driving seat clockwise or counterclockwise by 90° with a light-emitting direction of the switchable viewing angle display module as an axis. At this time, the first direction is essentially an upward or downward direction of the light-emitting surface of the display module, that is, a downward or upward direction in the cab space, and the drive electrodes in the viewing angle switching panel are essentially in a horizontal state and sequentially arranged along a vertical direction. Therefore, it is ensured that the drive electrodes receive sequentially increasing drive voltages from bottom to top along the cab, and the light exit angle of the liquid crystal panel gradually narrows from bottom to top along the cab. It can be seen from this that the switchable viewing angle display module may narrow the viewing angle on an upper side, that is, the vehicle machine and the instrument panel can be effectively prevented from emitting excessive light to a front windshield, and the light emitted from the vehicle machine and the instrument panel is prevented from being reflected by the front windshield into the human eyes, thereby avoiding visual disturbance.

It is to be noted that the preceding are only preferred embodiments of the present disclosure and technical principles used therein. It is to be understood by those skilled in the art that the present disclosure is not limited to the embodiments described herein. For those skilled in the art, various apparent modifications, adaptations, combinations, and substitutions can be made without departing from the scope of the present disclosure. Therefore, while the present disclosure has been described in detail via the preceding embodiments, the present disclosure is not limited to the preceding embodiments and may include more equivalent embodiments without departing from the inventive concept of the present disclosure. The scope of the present disclosure is determined by the scope of the appended claims.

What is claimed is:

1. A switchable viewing angle display module, comprising a viewing angle switching panel and a liquid crystal display panel, wherein the viewing angle switching panel is disposed on a light-emitting side of the liquid crystal display panel; and the viewing angle switching panel comprises:
   a first substrate and a second substrate;
   a dye liquid crystal layer disposed between the first substrate and the second substrate; and
   a drive electrode layer disposed on a side of the first substrate and/or a side of the second substrate facing the dye liquid crystal layer, wherein the drive electrode layer comprises a plurality of drive electrodes arranged sequentially along a first direction, an interval of a preset length is set between two adjacent ones of the plurality of drive electrodes, and the first direction is parallel to a light-emitting surface of the switchable viewing angle display module;
   wherein the switchable viewing angle display module further comprises a driver circuit, wherein the driver circuit is electrically connected to the plurality of drive electrodes, respectively and is configured to provide sequentially increasing drive voltages to the plurality of drive electrodes arranged sequentially along the first direction;
   wherein the driver circuit comprises a plurality of voltage dividing units, and each of the plurality of voltage dividing units comprises a first voltage dividing input terminal, a second voltage dividing input terminal, and a voltage dividing output terminal;
   wherein among each of the plurality of voltage dividing units, a first voltage dividing input terminal receives a first voltage signal, a second voltage dividing input terminal receives a second voltage signal, and voltage dividing output terminals are electrically connected to the plurality of drive electrodes in a one-to-one correspondence; and voltage dividing ratios of voltage dividing output terminals of the plurality of voltage dividing units are different.

2. The switchable viewing angle display module of claim 1, wherein the driver circuit further comprises an operational amplifier unit, and the operational amplifier unit comprises a first operational amplifier input terminal, a second operational amplifier input terminal, and an operational amplifier output terminal;
   wherein the first operational amplifier input terminal of the operational amplifier unit is connected to a clock signal, the second operational amplifier input terminal is connected to a reference voltage signal, and the operational amplifier output terminal is connected to the first voltage dividing input terminal or the second voltage dividing input terminal of each of the plurality of voltage dividing units; and
   wherein a voltage value of the reference voltage signal is less than a high-level voltage of the clock signal and greater than a low-level voltage of the clock signal.

3. The switchable viewing angle display module of claim 2, wherein each of the plurality of voltage dividing units comprises a first resistor and a second resistor, wherein a first terminal of the first resistor is the first voltage dividing input terminal and is electrically connected to the operational amplifier output terminal, a second terminal of the first resistor is the voltage dividing output terminal and is electrically connected to a first terminal of the second resistor and one of the plurality of drive electrodes, respectively, and a second terminal of the second resistor is the second voltage dividing input terminal and is grounded; and
   wherein ratios of resistance values of first resistors to resistance values of second resistors corresponding to the plurality of drive electrodes arranged along the first direction decrease sequentially.

4. The switchable viewing angle display module of claim 3, wherein the second resistor in each of the plurality of voltage dividing units has a same resistance value, and resistance values of the first resistors corresponding to the plurality of drive electrodes arranged along the first direction decrease sequentially.

5. The switchable viewing angle display module of claim 3, wherein the driver circuit is disposed on the viewing angle switching panel; and
   the first resistors, the second resistors, and at least part of the plurality of drive electrodes are prepared by using a same material and are prepared in a same layer.

6. The switchable viewing angle display module of claim 5, wherein areas of the first resistors corresponding to the plurality of drive electrodes arranged along the first direction decrease sequentially, and/or areas of the first resistors corresponding to the plurality of drive electrodes arranged along the first direction increase sequentially.

7. The switchable viewing angle display module of claim 2, wherein each of the plurality of voltage dividing units comprises a first thin film transistor and a second thin film transistor, a first terminal of the first thin film transistor is the first voltage dividing input terminal and is electrically connected to the operational amplifier output terminal, a second terminal of the first thin film transistor is the voltage dividing output terminal and is electrically connected to a first terminal of the second thin film transistor and one of the plurality of drive electrodes, respectively, and a second terminal of the second thin film transistor is the second voltage dividing input terminal and is grounded; and
   wherein ratios of equivalent resistances of first thin film transistors to equivalent resistances of second thin film transistors corresponding to the plurality of drive electrodes arranged along the first direction decrease sequentially.

8. The switchable viewing angle display module of claim 1, wherein the driver circuit is disposed on the viewing angle switching panel; or
   the switchable viewing angle display module further comprises a flexible circuit board, the flexible circuit board is bound to the viewing angle switching panel and/or the liquid crystal display panel, and the driver circuit is disposed on the flexible circuit board.

9. The switchable viewing angle display module of claim 1, wherein the viewing angle switching panel further comprises a common electrode layer disposed on a side of the second substrate and/or a side of the first substrate facing the dye liquid crystal layer; and
   wherein the common electrode layer comprises a plurality of common electrodes arranged sequentially along the first direction, and vertical projections of the plurality of common electrodes on a plane where the drive electrode layer is located at least partially overlap the plurality of drive electrodes in a one-to-one correspondence.

10. A switchable viewing angle display module, comprising a viewing angle switching panel and a liquid crystal display panel, wherein the viewing angle switching panel is disposed on a light-emitting side of the liquid crystal display panel; and the viewing angle switching panel comprises:
- a first substrate and a second substrate;
- a dye liquid crystal layer disposed between the first substrate and the second substrate; and
- a drive electrode layer disposed on a side of the first substrate and/or a side of the second substrate facing the dye liquid crystal layer, wherein the drive electrode layer comprises a plurality of drive electrodes arranged sequentially along a first direction, an interval of a preset length is set between two adjacent ones of the plurality of drive electrodes, and the first direction is parallel to a light-emitting surface of the switchable viewing angle display module;
- wherein the switchable viewing angle display module further comprises a driver circuit, wherein the driver circuit is electrically connected to the plurality of drive electrodes, respectively and is configured to provide sequentially increasing drive voltages to the plurality of drive electrodes arranged sequentially along the first direction,
- wherein a first alignment layer is further disposed on a side of the first substrate facing the dye liquid crystal layer, and a second alignment layer is further disposed on a side of the second substrate facing the dye liquid crystal layer; and
- wherein a vertical projection region of each of the plurality of drive electrodes on the first alignment layer or a vertical projection region of each of the plurality of drive electrodes on the second alignment layer is an electrode alignment region, and a vertical projection area of the interval on the first alignment layer or a vertical projection area of the interval on the second alignment layer is an interval alignment region, and an alignment direction of the electrode alignment region is perpendicular to an alignment direction of the interval alignment region.

11. The switchable viewing angle display module of claim 1, comprising a plurality of drive cycles, wherein in two adjacent ones of the plurality of drive cycles, a drive voltage in one cycle of the two adjacent cycles provided by the driver circuit has a same magnitude with and has a polarity opposite to a drive voltage in another cycle of the two adjacent cycles provided by the driver circuit.

12. A switchable viewing angle display module, comprising a viewing angle switching panel and a liquid crystal display panel, wherein the viewing angle switching panel is disposed on a light-emitting side of the liquid crystal display panel; and the viewing angle switching panel comprises:
- a first substrate and a second substrate;
- a dye liquid crystal layer disposed between the first substrate and the second substrate; and
- a drive electrode layer disposed on a side of the first substrate and/or a side of the second substrate facing the dye liquid crystal layer, wherein the drive electrode layer comprises a plurality of drive electrodes arranged sequentially along a first direction, an interval of a preset length is set between two adjacent ones of the plurality of drive electrodes, and the first direction is parallel to a light-emitting surface of the switchable viewing angle display module;
- wherein the switchable viewing angle display module further comprises a driver circuit;
- wherein the driver circuit comprises a control bus and a plurality of electrical device combinations, each of the plurality of electrical device combinations comprises a first electrical device and a second electrical device, and the control bus is electrically connected to a control signal port; in each of the plurality of electrical device combinations, a first terminal of the first electrical device is electrically connected to the control bus, a second terminal of the first electrical device is electrically connected to a first terminal of the second electrical device, and a second terminal of the second electrical device is electrically connected to a common signal port; in each of the plurality of electrical device combinations, first terminals of second electrical devices are also electrically connected to the plurality of drive electrodes arranged sequentially along the first direction in a one-to-one correspondence; and among a plurality of electrical device combinations corresponding to the plurality of drive electrodes arranged sequentially along the first direction, resistance ratios of first electrical devices to second electrical devices decrease sequentially; or
- the driver circuit comprises a control bus and a plurality of third electrical devices, the plurality of third electrical devices are sequentially connected in series with the control bus, the plurality of drive electrodes arranged sequentially along the first direction are electrically connected to the control bus respectively, and connection nodes of the plurality of drive electrodes and the control bus and the plurality of third electrical devices are sequentially and alternately arranged.

13. The switchable viewing angle display module of claim 12, wherein the driver circuit further comprises an operational amplifier, a forward input terminal or a reverse input terminal of the operational amplifier is electrically connected to the control signal port, the reverse input terminal or the forward input terminal of the operational amplifier is electrically connected to a reference signal port, and an output terminal of the operational amplifier is electrically connected to the control bus; and
- the control signal port provides a clock signal, the reference signal port provides a reference voltage, and a voltage value of the reference voltage is less than a high-level voltage of the clock signal and greater than a low-level voltage of the clock signal.

14. The switchable viewing angle display module of claim 13, wherein the first electrical device comprises a third resistor, the second electrical device comprises a fourth resistor, a first terminal of the third resistor is electrically connected to the output terminal of the operational amplifier, a second terminal of the third resistor is electrically connected to a first terminal of the fourth resistor and one of the plurality of drive electrodes, and a second terminal of the fourth resistor is grounded; and
- wherein ratios of resistance values of third resistors to resistance values of fourth resistors corresponding to the plurality of drive electrodes arranged along the first direction decrease sequentially.

15. The switchable viewing angle display module of claim 14, wherein each of the fourth resistors in the plurality of electrical device combinations has a same resistance value, and resistance values of the third resistors corresponding to the plurality of drive electrodes arranged along the first direction decrease sequentially.

16. The switchable viewing angle display module of claim 13, wherein each of the plurality of third electrical devices comprises a fifth resistor, fifth resistors of the plurality of third electrical devices are sequentially connected in series with the control bus, and the connection nodes of the plurality of drive electrodes and the control bus and the fifth resistors are sequentially and alternately arranged.

17. The switchable viewing angle display module of claim 13, wherein the first electrical device comprises a third thin film transistor, the second electrical device comprises a fourth thin film transistor, a first terminal of the third thin film transistor is electrically connected to the output terminal of the operational amplifier, a second terminal of the third thin film transistor is electrically connected to a first terminal of the fourth thin film transistor and one of the plurality of drive electrodes, respectively, and a second terminal of the fourth thin film transistor is grounded;

wherein ratios of equivalent resistances of third thin film transistors to equivalent resistances of fourth thin film transistors corresponding to the plurality of drive electrodes arranged along the first direction decrease sequentially; and wherein ratios of width-to-length ratios of the third thin film transistors and width-to-length ratios of the fourth thin film transistors corresponding to the plurality of the drive electrodes arranged sequentially along the first direction increase sequentially.

18. The switchable viewing angle display module of claim 13, wherein each of the plurality of third electrical devices comprises a fifth thin film transistor, fifth thin film transistors are sequentially connected in series with the control bus, and the connection nodes of the plurality of drive electrodes and the control bus and the fifth thin film transistors are sequentially and alternately arranged.

19. A vehicle, comprising the switchable viewing angle display module of claim 1.

20. The switchable viewing angle display module of claim 10, wherein the driver circuit further comprises an operational amplifier unit, and the operational amplifier unit comprises a first operational amplifier input terminal, a second operational amplifier input terminal, and an operational amplifier output terminal;

wherein the first operational amplifier input terminal of the operational amplifier unit is connected to a clock signal, the second operational amplifier input terminal is connected to a reference voltage signal, and the operational amplifier output terminal is connected to the first voltage dividing input terminal or the second voltage dividing input terminal of each of the plurality of voltage dividing units; and wherein a voltage value of the reference voltage signal is less than a high-level voltage of the clock signal and greater than a low-level voltage of the clock signal.

* * * * *